(12) United States Patent
Finnegan et al.

(10) Patent No.: US 11,171,803 B2
(45) Date of Patent: Nov. 9, 2021

(54) SMART HOME COMMUNICATIONS ARCHITECTURE

(71) Applicant: Switchmate Home LLC, Pleasanton, CA (US)

(72) Inventors: Dean Finnegan, Pleasanton, CA (US); Owen L Brown, Pittsfield, IL (US)

(73) Assignee: Switchmate Home LLC, Pleasanton, CA (US)

( * ) Notice: Subject to any disclaimer, the term of this patent is extended or adjusted under 35 U.S.C. 154(b) by 0 days.

(21) Appl. No.: 16/234,589

(22) Filed: Dec. 28, 2018

(65) Prior Publication Data

US 2019/0132396 A1 May 2, 2019

Related U.S. Application Data

(63) Continuation-in-part of application No. 15/846,005, filed on Dec. 18, 2017, now Pat. No. 10,172,082, (Continued)

(51) Int. Cl.
| | |
|---|---|
| *H04L 12/28* | (2006.01) |
| *H04L 29/08* | (2006.01) |
| *H04M 1/72415* | (2021.01) |
| *H04W 4/33* | (2018.01) |
| *H04W 4/38* | (2018.01) |
| *H04W 4/80* | (2018.01) |
| *H04W 84/12* | (2009.01) |

(52) U.S. Cl.
CPC ........ *H04L 12/2836* (2013.01); *H04L 12/282* (2013.01); *H04L 12/2814* (2013.01); *H04L 12/2818* (2013.01); *H04L 12/2825* (2013.01); *H04L 12/2827* (2013.01); *H04L 12/2834* (2013.01); *H04L 67/125* (2013.01); *H04L 67/34* (2013.01); *H04M 1/72415* (2021.01); *H04W 4/33* (2018.02); *H04W 4/38* (2018.02); *H04W 4/80* (2018.02); *H04L 2012/2841* (2013.01); *H04W 84/12* (2013.01)

(58) Field of Classification Search
CPC . H04L 12/2803–2838; H04L 2012/284–2841; H04L 67/12–125; H04L 69/18–26; H04M 1/72533; H04W 4/18–203; H04W 4/30; H04W 4/33; H04W 4/38; H04W 4/44; H04W 4/70; H04W 4/80; H04W 84/12; H04W 84/18–22; H04W 88/04; H04W 88/06; H04W 88/10
See application file for complete search history.

(56) References Cited

U.S. PATENT DOCUMENTS

| | | |
|---|---|---|
| 2008/0248768 A1 | 10/2008 | Doi et al. |
| 2013/0316769 A1 | 11/2013 | Kim |
| | (Continued) | |

OTHER PUBLICATIONS

Final Office Action dated Jul. 30, 2021 in connection with U.S. Appl. No. 15/846,080, 22 pages.

(Continued)

*Primary Examiner* — Timothy J Weidner

(57) ABSTRACT

Communications architecture, system topology and connectivity, messaging protocols, packet design, and control procedures, and implementation thereof in smart home and "internet of things" (IoT) systems and devices.

20 Claims, 15 Drawing Sheets

Related U.S. Application Data which is a continuation-in-part of application No. 15/368,573, filed on Dec. 3, 2016, which is a continuation-in-part of application No. 15/236,482, filed on Aug. 15, 2016, now Pat. No. 9,520,247, which is a continuation-in-part of application No. 14/617,020, filed on Feb. 9, 2015, now Pat. No. 9,418,802.

(60) Provisional application No. 62/424,467, filed on Nov. 20, 2016, provisional application No. 61/937,493, filed on Feb. 8, 2014, provisional application No. 62/065,564, filed on Oct. 17, 2014.

(56) References Cited

U.S. PATENT DOCUMENTS

| | | |
|---|---|---|
| 2014/0098227 A1 | 4/2014 | Chen et al. |
| 2014/0175181 A1 | 6/2014 | Warren et al. |
| 2016/0043827 A1 | 2/2016 | Filson et al. |
| 2016/0066212 A1* | 3/2016 | Visweswara ........ H04W 28/065 370/474 |
| 2017/0099157 A1* | 4/2017 | Jacobson ............. H04W 8/005 370/328 |
| 2018/0007141 A1* | 1/2018 | Hall ..................... H04W 4/025 370/329 |

OTHER PUBLICATIONS

Non-Final Office Action dated Jul. 16, 2021 in connection with U.S. Appl. No. 15/368,573, 23 pages.

* cited by examiner

Control Command: Light Switch Controller – Toggle ON
[ Dest. Device ID ] [    Msg ID    ] [Cmd ID 0x0001] [Toggle - ON]
  8726CB21149E    210144302B0E         0100               01

FIG. 9A

General Status: Light Switch Controller – Packet 00 — 1027

| Device ID | Dev. Type | Payload Type | Device Group | Pair Button State | Auth Status | Msg. ID | Firmw Ver. | Settings | Status |
|---|---|---|---|---|---|---|---|---|---|
| 3A24FB901427 | 01 | 00 | 08 | 00 | 01 | 653B | 0A0B0C | 58AF | 5B |

FIG. 10B

SMART HOME COMMUNICATIONS ARCHITECTURE

This application is a continuation-in-part of U.S. application Ser. No. 15/846,005, filed Dec. 18, 2017, issuing as U.S. Pat. No. 10,172,082 on Jan. 1, 2019, which is a continuation-in-part of U.S. application Ser. No. 15/368,573, filed Dec. 3, 2016, which is a continuation-in-part of U.S. application Ser. No. 15/236,482 filed Aug. 15, 2016, issued as U.S. Pat. No. 9,520,247 on Dec. 13, 2016; which is a continuation-in-part of U.S. application Ser. No. 14/617,020, filed Feb. 9, 2015, issued as U.S. Pat. No. 9,418,802 on Aug. 16, 2016; which claims priority from U.S. Provisional Patent Application No. 61/937,493, filed Feb. 8, 2014, and from U.S. Provisional Patent Application No. 62/065,564, filed Oct. 17, 2014; this application claims priority from U.S. Provisional Patent Application No. 62/424,467 filed Nov. 20, 2016 and from each of the applications enumerated in this paragraph, each of which is incorporated herein by reference in its entirety.

BACKGROUND

Although home automation systems are attaining wider adoption, there remains a high degree of fragmentation in the product space, with many manufacturers, brands, and designs competing for market share with a diversity of approaches, with little attention to the design of an architecture conducive to a home and device ecosystem into which this diverse mix of devices could comfortably and compatibly fit.

A modern home environment may include many devices, often from diverse sources, that are not designed for interoperativity. From the standpoint of the end user, it is desirable to have the ability to interact with this diversity of devices via a common interface, such as, for example, a smart phone, a cloud application, or a digital assistant device. Current home automation systems are typically "siloed" in the sense that interoperativity is limited to devices from a single source and/or belonging to a single family. Further, current devices and systems are typically limited to operation via system, device, and/or communications architectures that are inherently very incompatible with other important goals such as, for example, long battery life, long maintenance intervals, full motion high resolution video capability, rapid response and low latency, simple installation of both hardware and software within the capabilities of typical end users, simple and/or automatic updating of software and/or firmware without disruption of function or end user intervention, compatibility with multiple communications technologies and/or protocols, seamless and/or automated and/or manufacturer-agnostic compatibility for installation of additional devices to the system and/or removal of devices from the system, simple relocation of devices, and compatibility and/or interoperability with legacy devices.

SUMMARY

In general, disclosed herein are embodiments of novel systems, devices, and methods useful for automating, monitoring, and controlling a home or office environment and devices and/or fixtures therein, embodying system, device, and/or communications architectures providing convenient and end-user-friendly operation consistent with the foregoing goals. The disclosure hereof may be found useful for implementation and operation of an ecosystem of software, firmware, hardware and communication transports for remote controlling, monitoring and capturing data of home and business automation devices and/or security systems, including but not limited to devices used for lighting control, video/audio capturing, audible siren alerts, intrusion detection, window/door access detection, water detection, garage door opening, and even factory production equipment, in which the ecosystem may provide communication flexibility across differing platforms and product branding regardless of quantity and device types of varying functionality.

In an exemplary embodiment, there is provided a system for management of a smart home environment having a Wi-Fi enabled Internet access point where in the system includes a dispatch unit and a smart home peripheral device. In embodiments, the dispatch unit is adapted and configured to receive a Wi-Fi transmission embodying a message, in response thereto produce a communication compatible for transmission over a Bluetooth Low Energy (BLE) connection to the smart home peripheral device, wherein the communication includes a message packet having a header portion including a device identifier designating and address of a smart home peripheral device to which the message is directed and a payload portion including an instruction to the smart home peripheral device designated by the device identifier. The smart home peripheral device may include a functional unit, and the smart home peripheral device may be adapted and configured to receive the BLE communication including the message packet and to operate the functional unit in accordance with the instruction.

In another exemplary embodiment, there is provided a system including a smart home peripheral device and a communication path, wherein the communication path comprises a smart phone adapted and configured to relay to the smart home peripheral device via a BLE wireless connection a communication received by the smart phone via a Wi-Fi connection.

In some embodiments, an object of the present disclosure is to provide systems, devices, communications modalities, and system architectures compatible for communication to and/or from devices operating with different communications modalities and/or protocols.

In some embodiments, an object of the present disclosure is to provide systems, devices, communications modalities, and system architectures compatible for interoperativity with and/or between home automation devices from more than one source, manufacturer, and/or device family.

In some embodiments, an object of the present disclosure is to provide systems, devices, communications modalities, and system architectures facilitating the interoperability of smart home systems and devices with digital assistants such as, for example, Google Assistant, Amazon Echo, Amazon Alexa, Siri, and Cortana.

In some embodiments, an object of the present disclosure is to provide systems, devices, communications modalities, and system architectures enabling and/or supporting improved power conservation and/or long battery life in devices interacting with the system.

In some embodiments, an object of the present disclosure is to provide systems, devices, communications modalities, and system architectures enabling and/or supporting improved maintenance-free operation and/or long maintenance intervals in devices interacting with the system.

In some embodiments, an object of the present disclosure is to provide systems and architectures adapted for compatibility of control, sensing, communication, and other devices with other home and/or workplace automation ecosystem devices and/or components available currently and/or in the future, such as, for example, Nest, Amazon Echo, Samsung Home, and Google Home.

In some embodiments, an object of the present disclosure is to provide systems and architectures conducive to smart home, home automation, workplace automation, and/or security system ecosystems having flexibility to accept and interact with a variety of devices having a variety of functions.

In some embodiments, an object of the present disclosure is to provide systems and architectures conducive to smart home, home automation, workplace automation, and/or security products that are remotely accessible and/or controllable from a common interface, such as a smart phone, a server, or a digital assistant device.

In embodiments, an object of the present disclosure is to provide systems and architectures compatible with smart home devices and components that require no wired connections for their installation and/or operation.

In embodiments, an object of the present disclosure is to provide systems and architectures adapted for installation of smart home systems and components without a need for specialized expertise and/or tools and/or without regulatory permissions and/or within the capabilities of a typical homeowner or consumer to install.

In some embodiments, an object of the present disclosure is to provide systems and architectures for smart home, home automation, workplace automation, and/or security products adapted for updating of software and/or firmware with minimal or no user action.

In some embodiments, an object of the present disclosure is to provide systems and architectures adapted for self-integration and/or simple user installation of control, sensing, communication, and other devices in a smart home, home automation, workplace automation, and/or security system ecosystem.

It will be apparent to persons of skill in the art that various of the foregoing aspects and/or objects, and various other aspects and/or objects disclosed herein, can be incorporated and/or achieved separately or combined in a single device, method, system, composition, article of manufacture, and/or improvement thereof, thus obtaining the benefit of more than one aspect and/or object, and that an embodiment may encompass none, one, or more than one but less than all of the aspects, objects, or features enumerated in the foregoing summary or otherwise disclosed herein. The disclosure hereof extends to all such combinations. In addition to the illustrative aspects, embodiments, objects, and features described above, further aspects, embodiments, objects, and features will become apparent by reference to the drawing figures and detailed description. Also disclosed herein are various embodiments of related methods, devices, apparatus, compositions, systems, articles of manufacture, and/or improvements thereof. The foregoing summary is intended to provide a brief introduction to the subject matter of this disclosure and does not in any way limit or circumscribe the scope of the invention(s) disclosed herein, which scope is defined by the claims currently appended or as they may be amended, and as interpreted by a skilled artisan in the light of the entire disclosure.

BRIEF DESCRIPTION OF THE FIGURES

FIG. 9A depicts another example embodiment of a smart home system control command packet consistent with the disclosure hereof.

FIG. 10B depicts an example embodiment of a smart home system general status packet consistent with the disclosure hereof.

Figure 1A:
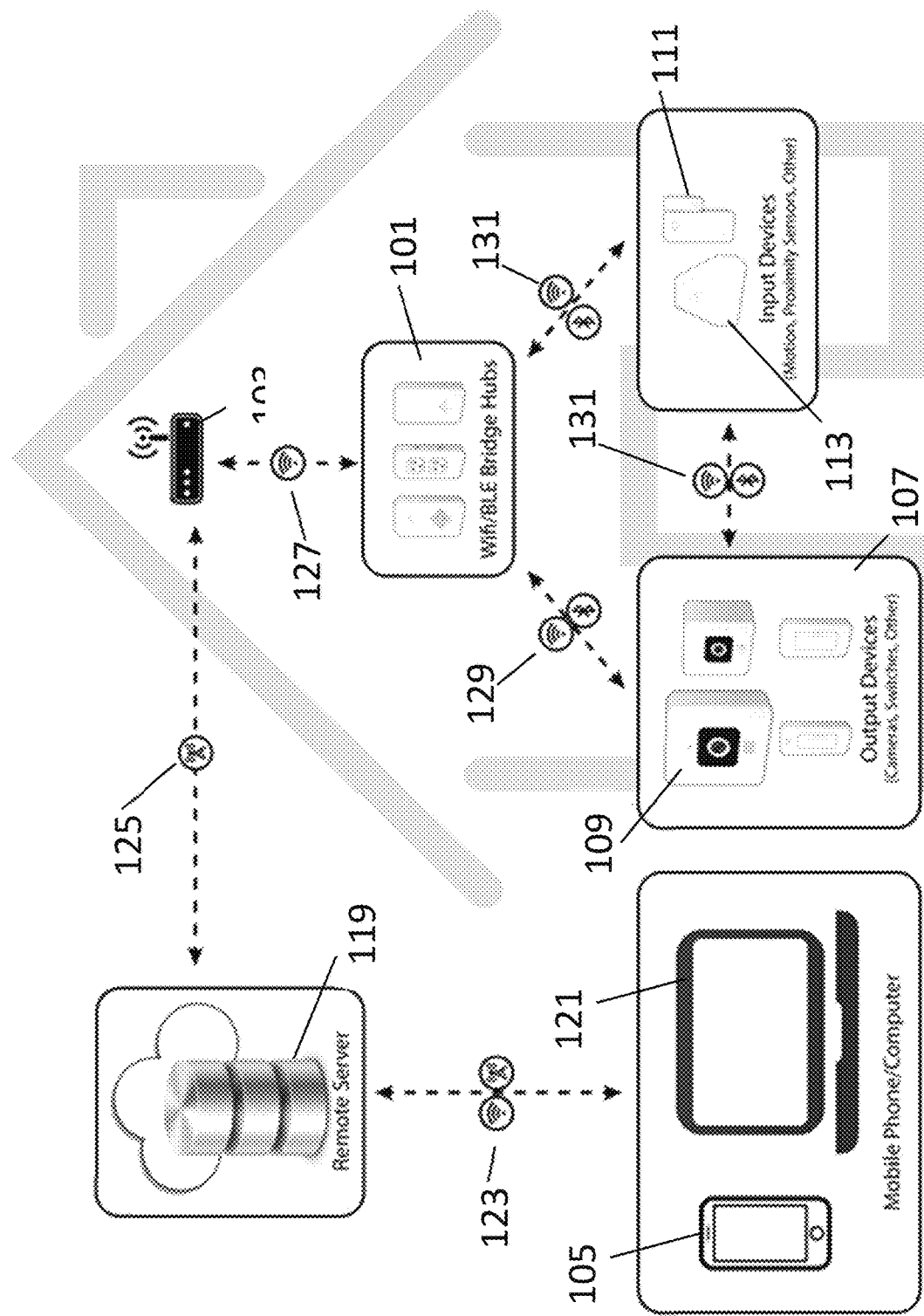
FIG. 1A shows a schematic depiction of an example embodiment of portions of a smart home ecosystem consistent with the disclosure hereof.

Figures are not to scale unless expressly so labeled, and relative positions of objects and components are illustrative. Persons of skill in the art will recognize that many other arrangements, configurations, dimensions, and selections of components are possible and consistent with the disclosure hereof, and are in no way limited to the embodiments shown in the figures.

DETAILED DESCRIPTION

Disclosed herein are embodiments of novel methods, systems, devices, apparatus, compositions, articles of manufacture, and improvements thereof useful for automating, monitoring, and controlling a home or office environment and devices and/or fixtures therein, embodying system, device, and/or communications architectures providing convenient and end-user-friendly operation, interoperability with and between a diverse selection of devices, and integration with a diverse selection of control and communication modalities such as smart phones, cloud applications, and digital assistant devices and applications.

Smart home systems and devices present unique challenges in that they must interact and cooperate with an already existing and typically complex technological ecosystem, and with devices and products not designed for such interactivity. A home automation environment in which a smart home automation system is to operate may preferably be adaptable for adding, removing, and/or "hot-swapping" devices having a variety of functions, which may or may not be designed for compatibility with other devices present in the environment. The home automation environment may include, for example, any devices, components, and/or other aspects of the physical and/or technological infrastructure relating to a deployment site of interest, such as, for example, the physical premises, structures, devices, components, and/or fixtures in and around the home or other deployment site; any environmental, utility, security, entertainment, and appliance systems and devices that may be present; any control, sensing, and/or monitoring systems and devices; communications infrastructure such as internet, telephone, smart phones, and cable television; and/or any smart home, home automation, Internet of Things (IoT) or other similar systems and/or components. In embodiments, a smart home system and/or devices and components thereof may typically be installed into the context of an existing home ecosystem and may interoperate with devices and components already present therein, turning the home ecosystem into, and becoming part of, a smart home ecosystem. In some embodiments, a smart home ecosystem could include a home environment with whatever devices, components, appliances, and other aspects may be present, plus one or more other smart home devices or components such as any of those disclosed herein. In embodiments, a home automation environment may typically include a wireless internet access point, such as, for example, an internet connection accessible via a home wireless router, which may typically provide communication with the internet via a Wi-Fi protocol.

FIG. 1A depicts one example of a home automation environment, wherein a user may interact with the system using a mobile phone 105 or computer 121 to communicate 123, via the Internet (such as, for example, via a Wi-Fi connection) or over a cellular network, with a remote server 119, which in turn may issue instructions that are communicated 125 over the internet to a wireless internet access point 103. In some embodiments the instructions may then be relayed 127 via a Wi-Fi connection from the wireless internet access point to a dispatch unit 101, which may, in some embodiments, function as a Wi-Fi-BLE bridge to convert the instruction from a Wi-Fi protocol to a Bluetooth Low Energy ("BLE") protocol and retransmit 129, 131 the instruction via a BLE connection to a smart home peripheral device, such as, for example, any one or more of a camera 109, switch automation device 107, or other output device, a motion sensor, proximity sensor, intrusion sensor 111, doorbell or other alert device 113, or other input device, or any other smart home peripheral device incorporating a functional unit operable to perform any other desired function. In embodiments where found useful, communications 131 may be made between two smart home peripheral devices, such as by a Wi-Fi or BLE connection.

Figure 1B:
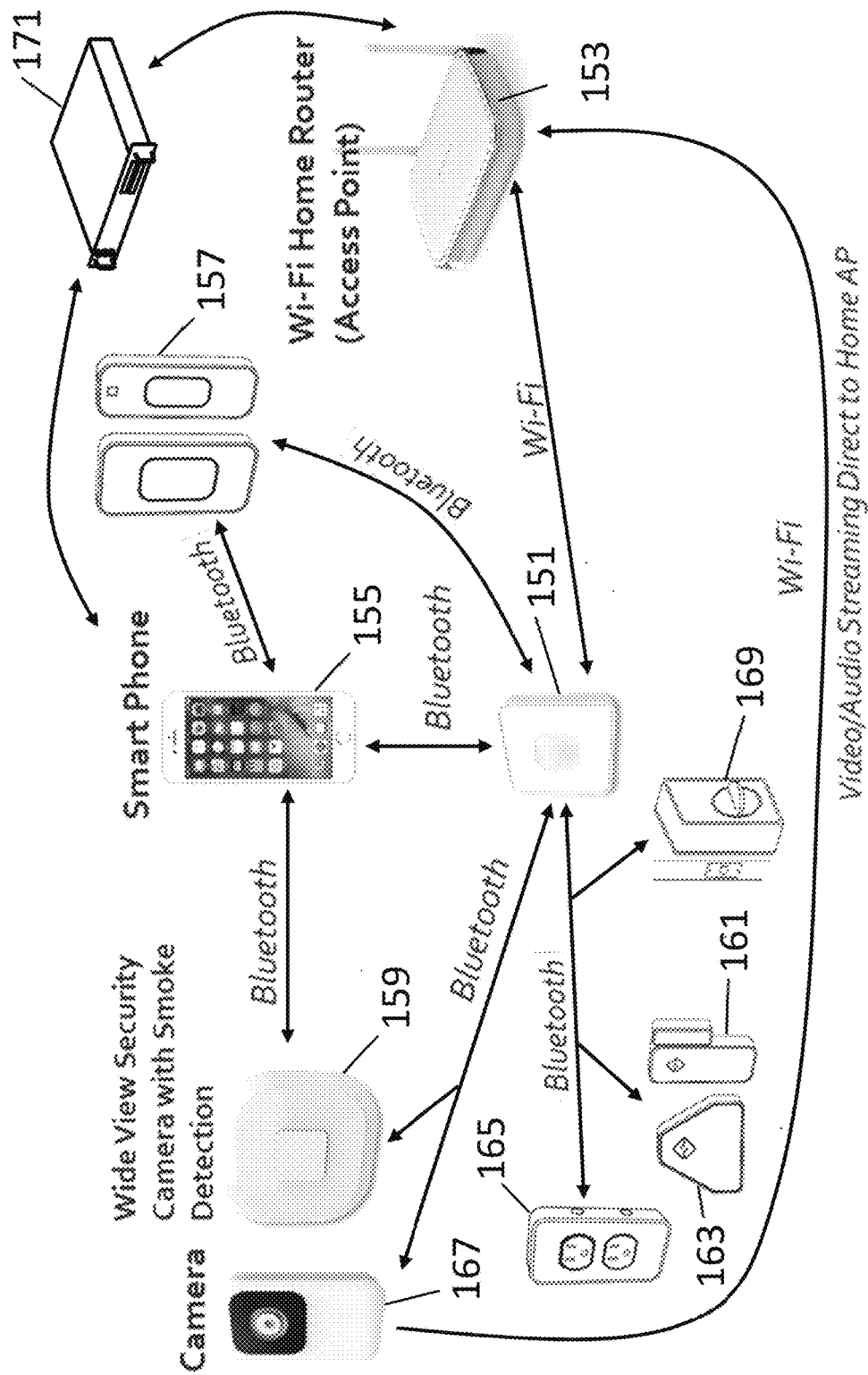
FIG. 1B shows another schematic depiction of an example embodiment of portions of a smart home ecosystem consistent with the disclosure hereof.

In another illustrative embodiment as depicted generally in FIG. 1B, a smart home system according to the disclosure hereof could encompass a wide variety of devices and/or components for controlling, monitoring, and/or interacting with a home ecosystem. For example, there may be provided a dispatch device 151 which may communicate with, exchange data with, send instructions to and/or receive instructions from other devices. A user may interface with a dispatch device by any modality operable to provide the desired communication, such as, for example direct Wi-Fi or BLE communication using a smart phone 155 or other device, or via a wireless or cellular network connection to a cloud server 171, thence to an Internet access point 153, and then by a Wi-Fi or other wireless connection to the dispatch device. In embodiments, such communication could be by direct wireless communication with another device, or by communication with a remote device via the Internet and/or a local area network, such as through a connection via a home router 153 with an Internet access device such as a DSL or cable modem, or by communication over a cellular or other network, or in any other manner effective to communicate the desired signal or data.

In embodiments, a control or user interface device, such as a smart phone or tablet having the capability to present a suitable user interface and to communicate wirelessly via a suitable protocol such as Bluetooth or Wi-Fi, may be configured to communicate instructions and/or receive data such as, for example, device status information and/or sensor data, directly with other devices of the system, or by relaying instructions and/or data through the dispatch device, or by any other communications architecture operable to transmit instructions and/or date from a source device to a destination device. For example, a smart phone or tablet could be configured to forward an instruction via a cellular network to a server and thence over an internet connection through an internet access device and home router to a coordinating device, which could dispatch the instruction to a peripheral device; data from the peripheral device could be directed back to the smart phone or tablet via the same route, or could be routed directly through the home router, bypassing the coordinating device. In embodiments, a dispatch device may employ a low energy wireless protocol, such as, for example, Bluetooth Low Energy, for command and/or control communication with one or more peripheral devices. In some embodiments of a smart home system there may be provided smart home peripheral devices, which could include any devices found useful for controlling, monitoring, and/or interacting with any desired aspects of a home ecosystem or environment. Examples of smart home peripheral devices could include automated and/or remotely controllable actuators 157 for operating any controllable devices or services present in the home ecosystem, such as, for example, light switches, HVAC controls, or security system controls; controllable electrical receptacles 165; sensors, such as sensors for smoke 159, fire, or other environmental conditions, door and window security sensors 161, door lock automation devices, or doorbell or visitor alert sensors 163; and video devices, such as remote viewing cameras 167 and/or security cameras 169. In embodiments, smart home peripheral devices could include single function devices, or multiple functions could be combined in a single device, or in any other combination found useful in an application of interest. In embodiments, a smart home peripheral device may include a functional unit adapted and configured to perform any one or more functions found useful for an application of interest. Examples of functional units may include actuators, sensors, cameras, display interfaces, switches, user controls, appliances or components thereof, and devices or components adapted and configured to perform any useful task upon initiation by or under the control of an automated process or a user.

In some embodiments, a deployment context or environment for a smart home system could include a home, apartment, or other residence premises, and a smart home ecosystem could include the home, apartment, or residence itself, together with its electrical and plumbing systems, appliances, entertainment systems, security and locking systems, and any other systems, objects, or components present in or around the home or apartment capable of being controlled, monitored, or interacted with by a smart home system or device. It will be apparent that many of the systems, devices, and methods disclosed herein could also be applied in other contexts, not necessarily residential. The disclosure hereof is not limited to residences and will be found useful in many other contexts, such as, for example, hotels, offices, vehicles, and workplace automation environments, and/or distributed over more than one such context. For brevity herein the words 'home' and 'smart home' will be used to denote any of the systems, devices, and methods disclosed herein, regardless of whether installed in and/or intended for installation in a domicile or any other deployment site, and disclosure relating to 'home' and/or 'smart home' devices and systems herein should be understood to extend to any environments where the disclosed functionality may be found useful. Although reference may be made herein to "home automation" and/or "smart home" systems, it will be apparent that the innovations, methods, devices, and systems disclosed will be found useful for many other applications, such as for example office automation, factory automation, workplace automation, and automation of commercial premises. Thus, for example, a system including a dispatch unit and at least one smart home peripheral device as disclosed herein, installed in an office or other place of business including an internet connection accessible via a wireless router or other internet access device, could be another example of an embodiment of a smart home ecosystem.

Figure 2A:
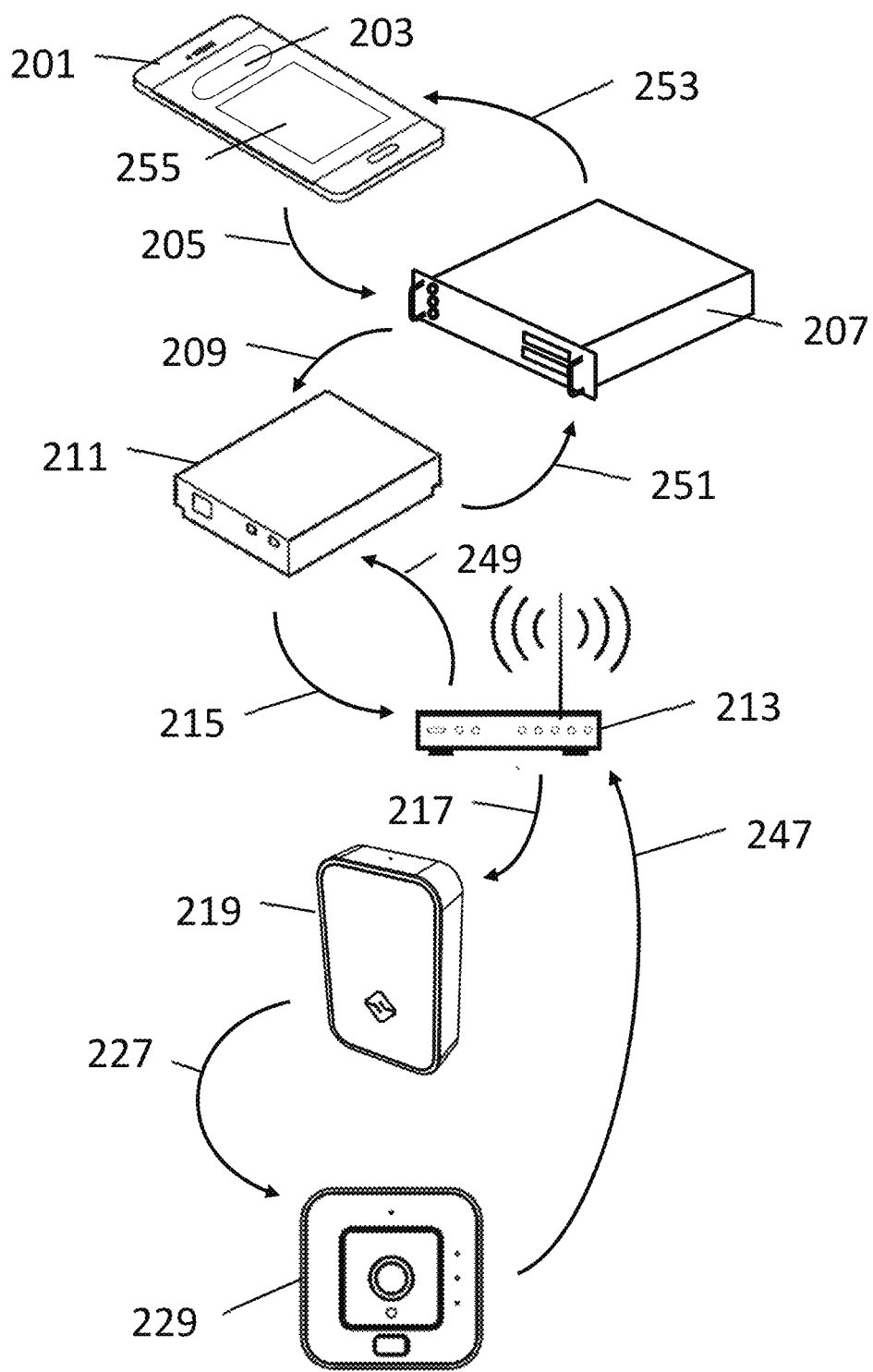
FIG. 2A shows a schematic depiction of an example embodiment of a smart home system and communications architecture consistent with the disclosure hereof.
Figure 2B:
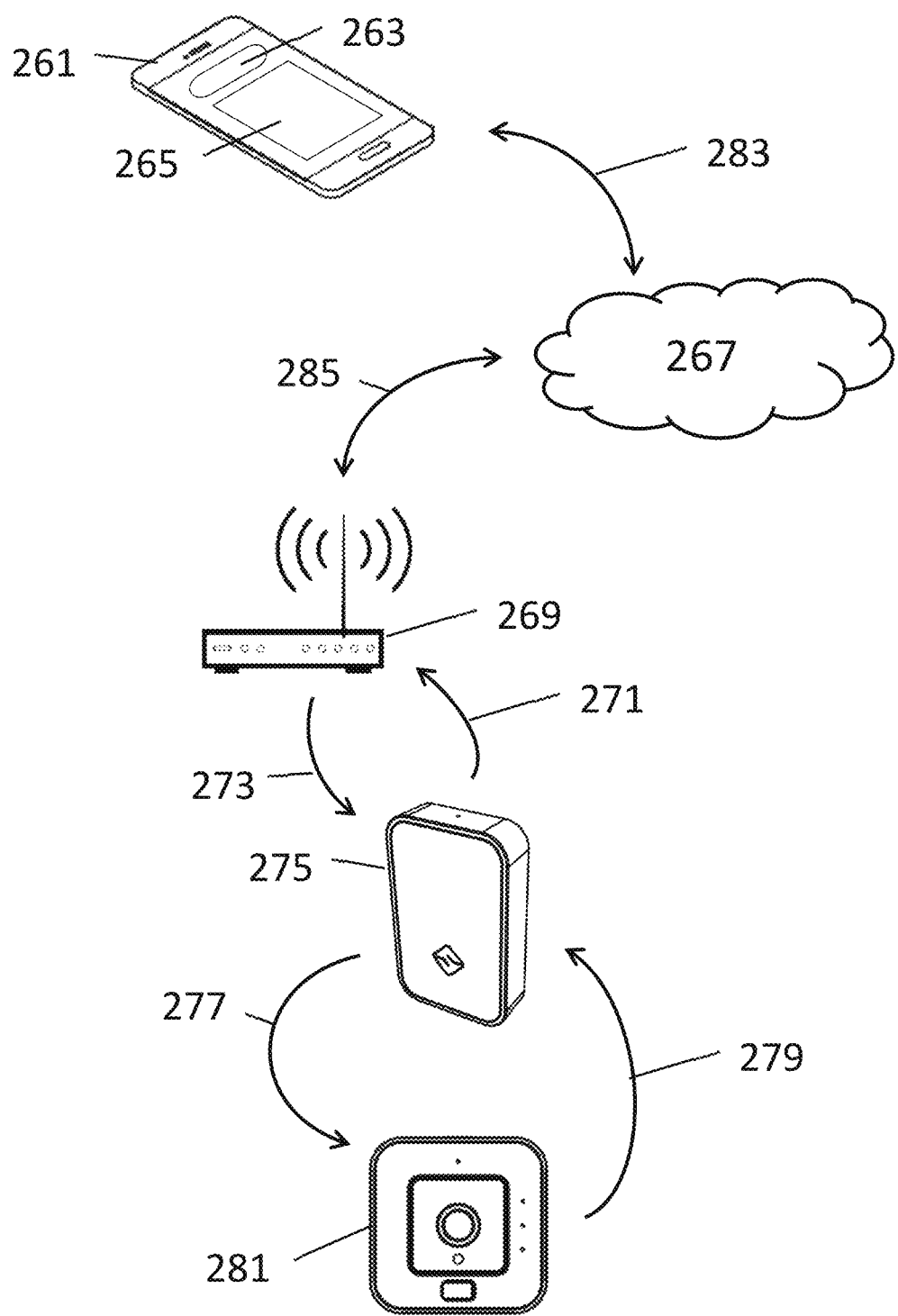
FIG. 2B shows a schematic depiction of another example embodiment of a smart home system and communications architecture consistent with the disclosure hereof.

In general, in various embodiments there may be provided a communications architecture having any topology and/or connectivity found useful for an application of interest. Examples illustrating suitable topologies are depicted in FIGS. 2A and 2B. In embodiments such as illustrated in FIG. 2A, a smart home ecosystem or other deployment context may typically have present an internet connection accessible via a wireless internet access point, such as, for example, an internet-connected home wireless router 213, which may provide connectivity to the Internet via a modem, cable box, or other connectivity device 211. In some embodiments, a wireless router functionality and Internet connectivity may be combined in a's single device. In an illustrative basic use case as depicted in FIG. 2 a user is enabled to access the system from a remote location where the device(s) to be accessed are not within Wi-Fi or Bluetooth range of the user's smart phone. In an embodiment as shown, a user may employ a smart phone 201 to communicate to 205 and from 253 a server 207 resident in the cloud; this communication could be via a connection directly from the smart phone to the Internet, such as through a Wi-Fi or other wireless connection, or could be via a cellular telephone or other network. Using the smart phone and the user interface 255 and/or controls 203 provided thereby, a user may initiate a communication to and/or from a smart home peripheral device 229. In embodiments, a communication 205 from the user would be received and processed by an application running on the server 207, which would interpret the user's intention and transmit a communication 209 in accordance there with to the home Internet access point 211 and thence to a home Wi-Fi router 213. In response thereto, the home Wi-Fi router would transmit a wireless communication via a Wi-Fi protocol to a dispatch device 219. The dispatch device would receive the communication and reconstitute it in the form of a wireless communication via a BLE protocol, which would be received by the intended smart home peripheral device 229, which could include any smart home peripheral device, but may typically include a smart home peripheral device having functionality needing a relatively high bandwidth connection back to the Internet access point, such as, for example, a video camera. The smart home peripheral device may generate and transmit a communication 247 via a Wi-Fi protocol directly to the home Wi-Fi router, from whence it may be relayed 249, 251 back to the cloud server, where it may optionally be processed and a communication 253 relayed back to the smart phone or other initiating device.

In another embodiment, there is provided a communications architecture having a topology as depicted in FIG. 2B. In this illustrative embodiment there is again provided a user control device 261 such as, for example, a smart phone, provided with a user interface 265 and/or one or more user controls 263 and having or capable of establishing a two-way connection 283 with the Internet or "cloud" 267 and/or a device thereof. In embodiments such as illustrated in FIG. 2B, a user control device 261, such as, for example, a smart phone, tablet, or personal computer, capable of communicating with a server via the internet, a cellular network, a local area network, or by any other operable communication modality, may be provided with an application adapted and configured to respond to one or more user controls 263, 265 to generate instructions and/or commands for operating peripheral device(s) 281 incorporated in a smart home system. In an embodiment, a user control may include any device, component, user interface widget, sensor, or other object adapted to detect a user intention and thereupon produce a response in another device or application. There is provided a further two-way connection between the cloud and/or a device thereof and/or an application running thereon and a wireless Internet access point 269 present in the home environment or other installation context of interest. The wireless Internet access point could include a single device or two or more devices having in combination, functionality to provide wireless Internet access via a Wi-Fi protocol to devices situated within the home environment or other installation context. Examples of wireless Internet access points could include a device integrating a Wi-Fi router with a DSL modem, fiber optic modem, cable modem, cellular network access device, satellite Internet access device, or wireless Internet access device. Other examples of wireless Internet access points could include any combination of the foregoing, connected in any manner operable to provide Wi-Fi connectivity to devices within a home environment or other installation context. An internet access point device could include any device or interface operable to establish a connection to the internet. Examples of an internet access point device could include a DSL or cable modem, a satellite internet transceiver system, and/or a device for accessing the internet via a cellular telephone or data network. In embodiments, a wireless router or wireless internet access point could include any device or combination of devices for providing wireless communication between another device and the internet; thus a wireless router could be a standalone component or could be one component of a wireless internet access point of which another component could include a wireless internet access device. Thus a wireless internet access point could include any device or combination of devices operable to allow other devices to connect wirelessly to the internet.

In embodiments as illustrated generally in FIG. 2B, a dispatch unit 275 may be situated at any convenient location within the home environment within Wi-Fi range of the Internet access point and within BLE range of any smart home peripheral device(s) 281 desired to be included within the smart home system. In some embodiments, a dispatch unit may include at least a wireless receiver compatible for wireless communication with a home router or wireless internet access point, and could include any wireless receiver operable to receive an activation request transmitted by a wireless router or wireless internet access point present in the smart home ecosystem; a transmitter operable on a low energy wireless protocol, such as a BLE; and an interface for operatively connecting the wireless receiver and the dispatch transmitter. An interface of a dispatch unit may include any device and/or component, implemented in hardware, software, firmware, or any combination thereof, for processing and/or relaying a communication received by the wireless receiver to the dispatch transmitter in a form compatible for transmission by the dispatch transmitter in accordance with the protocol under which the dispatch transmitter is configured to operate. In embodiments, an interface could be a simple interface merely relaying a message received by the wireless receiver to the dispatch transmitter for transmission with minimal or no change in message content, or could include a device or component for processing a message received by the wireless receiver to a form and manner compatible for transmission of the signal by the dispatch transmitter, or could include a device or component or logic for generating and causing transmission of a new or different transmission. Thus, for example, in some embodiments, a dispatch unit could be adapted and configured to receive a Wi-Fi communication, and the interface could be adapted and configured to extract a message or data there from and repackage all or part of the message or data in a form suitable for BLE transmission and pass the repackaged communication to the dispatch transmitter for transmission as a BLE communication.

Communications originating from a user control device may be passed 283 to an Internet cloud device such as a server and/or application running thereon, thence 285 to the wireless Internet access point, then wirelessly communicated 273 via a Wi-Fi protocol to the dispatch unit, which may perform any processing required to produce from the incoming Wi-Fi communication an outgoing wireless communication 277 via a BLE protocol, which may be received by a smart home peripheral device to which the communication is addressed. A wireless communication 279 originating from a smart home peripheral device 281, which could include a communication produced in response to a communication 277 received by the smart home peripheral device, may be transmitted according to a BLE protocol, received by the dispatch unit, processed to produce an outgoing wireless communication 271 according to a Wi-Fi protocol, which may be received at the wireless Internet access point and relayed back to the cloud server and/or the user control device.

Figure 3:
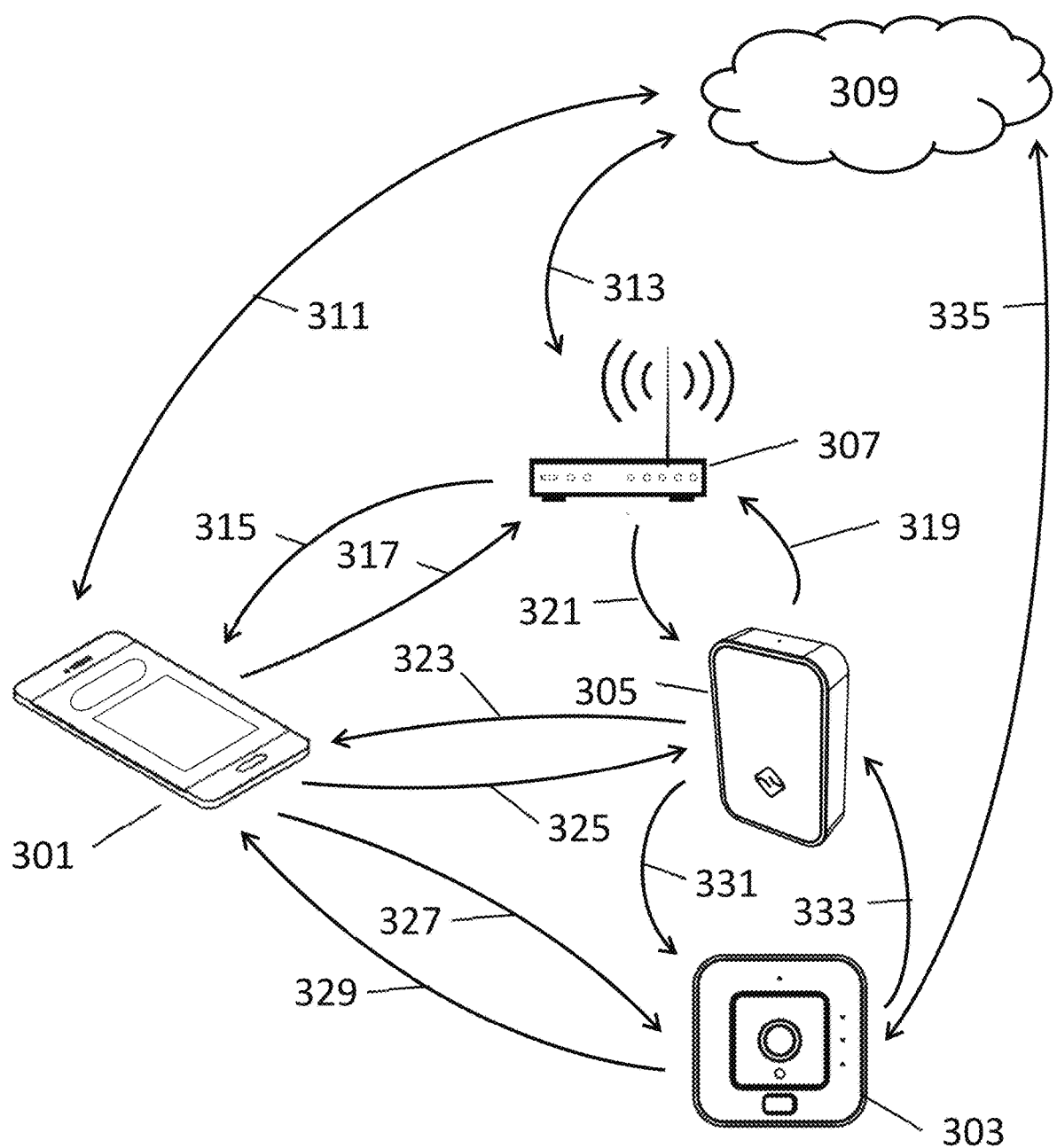
FIG. 3 shows a schematic depiction of an example embodiment of a smart home system and communications architecture consistent with the disclosure hereof.

In another embodiment, there is provided a communications architecture having a topology as depicted in FIG. 3. In this illustrative embodiment there is again provided a user control device 301 such as, for example, a smart phone. A smart phone may include functionality operable to transmit and receive wirelessly via either or both of a Wi-Fi connection and a BLE or other Bluetooth connection, and also to communicate via a cellular network telephone or data connection. Particularly in use cases where the user control device is present in the home environment or other installation context and within wireless range of the indicated devices, the communications architecture may provide multiple paths for relaying communications between devices, such as between a user control device and a smart home peripheral device. As in the previous illustrative embodiments, a command, instruction, or other communication 311 originating from the user could be transmitted directly from the user control device to a cloud server or other Internet device 309, or indirectly 315, 317 via wireless communication with the home Internet access point, and communication could then proceed to and/or from a smart home peripheral device via any operable path, such as those described in the preceding paragraphs and illustrated in FIGS. 2A and 2B. In some embodiments, a user control device could transmit a command, instruction, or other communication 325 wirelessly via a Wi-Fi transmission directly to a dispatch unit 305, whereupon the communication could be processed by the dispatch unit and an outgoing communication constructed and transmitted 331 wirelessly via a BLE protocol; the BLE communication could then be received and acted upon by a smart home peripheral device 303 to which the communication is addressed. If desired, a responsive communication 333 could be transmitted via a BLE protocol to the dispatch unit, where it could be processed to produce an outgoing Wi-Fi transmission 323 back to the user control device, or, where useful for an application of interest, relayed to another smart home peripheral device via a Wi-Fi or BLE transmission from the dispatch unit or in any other manner operable to deliver the communication to the intended device. In some embodiments, a user control device such as, for example, a smart phone equipped with an application operable to coordinate the indicated communications, could communicate 327 commands, instructions, and/or other communications directly to a smart home peripheral device via either a Wi-Fi or BLE connection, and/or receive responses, status messages, data, or other communications directly from a smart home peripheral device directly via either a Wi-Fi or BLE connection. In some embodiments, a user control device such as, for example, a smart phone equipped with a suitable application, could provide a communication channel between an Internet access point 307 and a smart home peripheral device 303 by receiving a wireless transmission 315 such as, for example, a Wi-Fi transmission, from the Internet access point, optionally processing the communication or message, and outputting a wireless transmission 327, such as, for example, a BLE transmission, to be received by the smart home peripheral device. Similarly, the smart home peripheral device could transmit a wireless communication 329, such as, for example, a BLE transmission, which could be received by the user control device, optionally processed, and a responsive wireless transmission 317, such as, for example, a Wi-Fi transmission, made and received by the home Internet access point. In this way, a communication path may be provided between a wireless Internet access point having only Wi-Fi functionality and a smart home peripheral device communicating on a BLE protocol. In some embodiments, a smart home peripheral device equipped with a suitable transceiver may communicate 335 directly with a cloud server, or may communicate 327, 329 with a user control device, via a cellular network telephone or data connection.

A topology as illustrated in FIG. 3 may provide a large variety of possible communication paths between nodes or devices, each "hop" or edge of which could be according to an arbitrarily chosen protocol which could be different from the protocol(s) employed for other portions of the illustrated topology; the disclosure hereof extends to all such communication paths implemented using any wireless or other communications protocol operable for communications between the devices corresponding to the nodes of the chosen topology.

Figure 4:
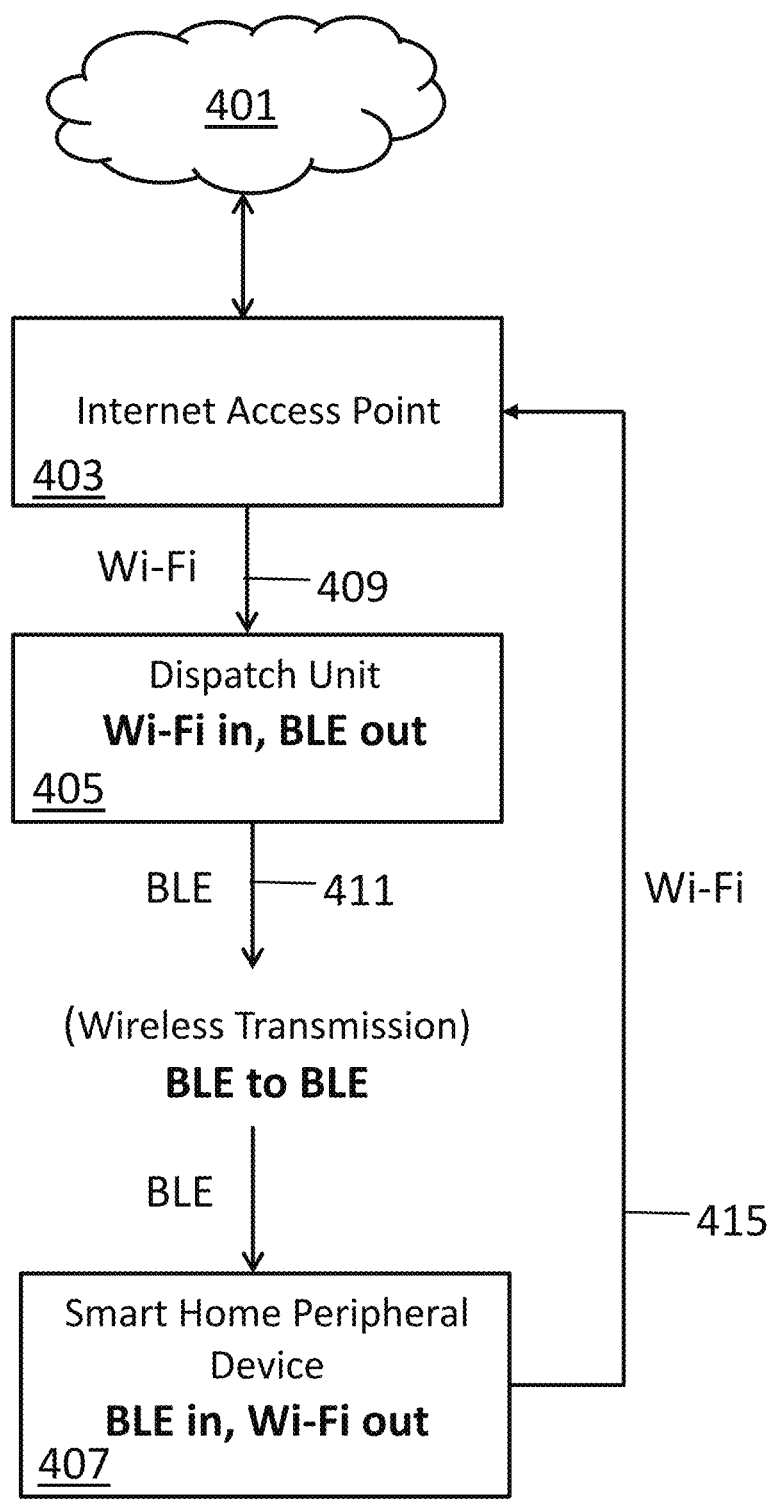
FIG. 4 depicts a block diagram of communication pathways corresponding to an example embodiment of a communications architecture consistent with the disclosure hereof.
Figure 5:
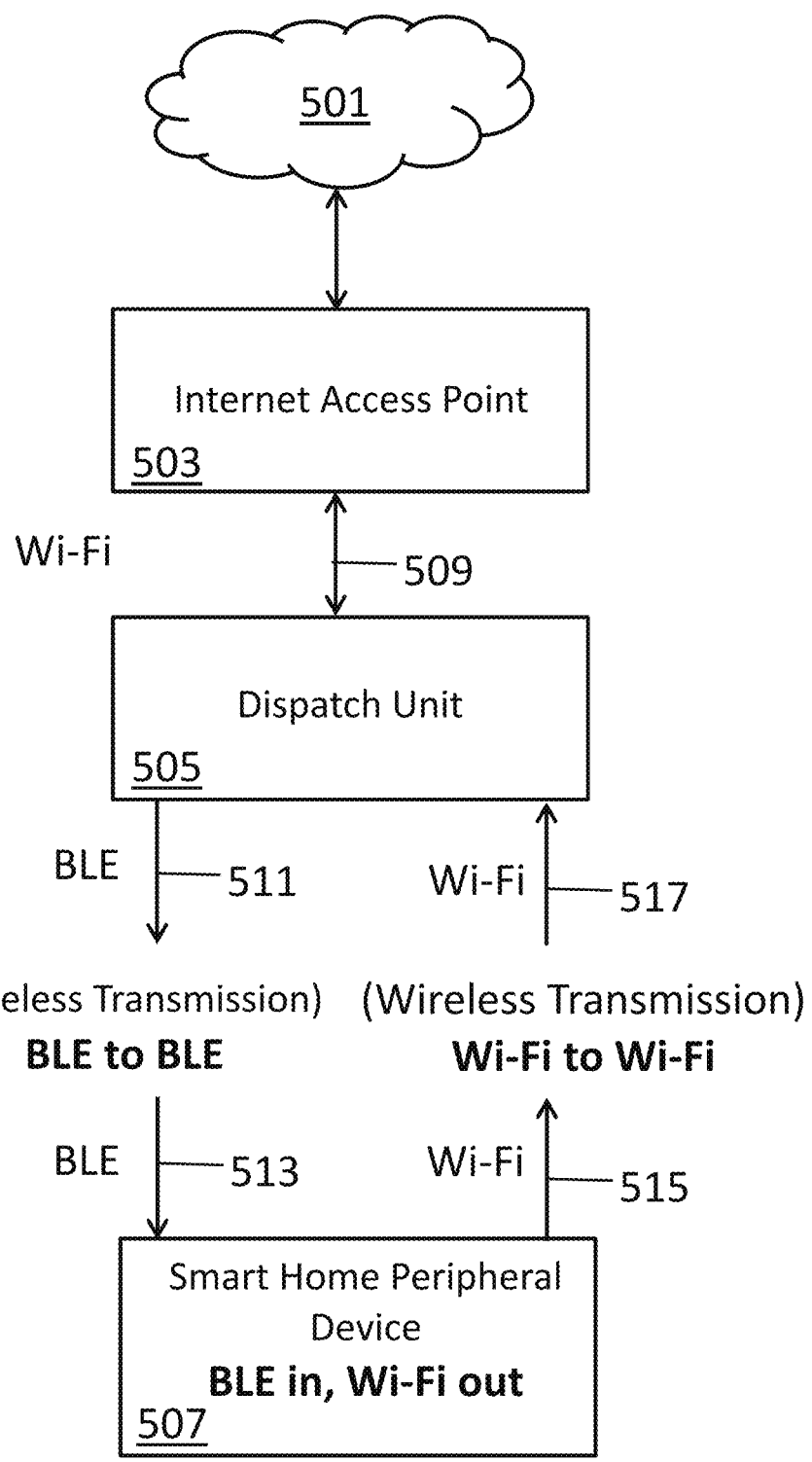
FIG. 5 depicts a block diagram of communication pathways corresponding to another example embodiment of a communications architecture consistent with the disclosure hereof.
Figure 6:
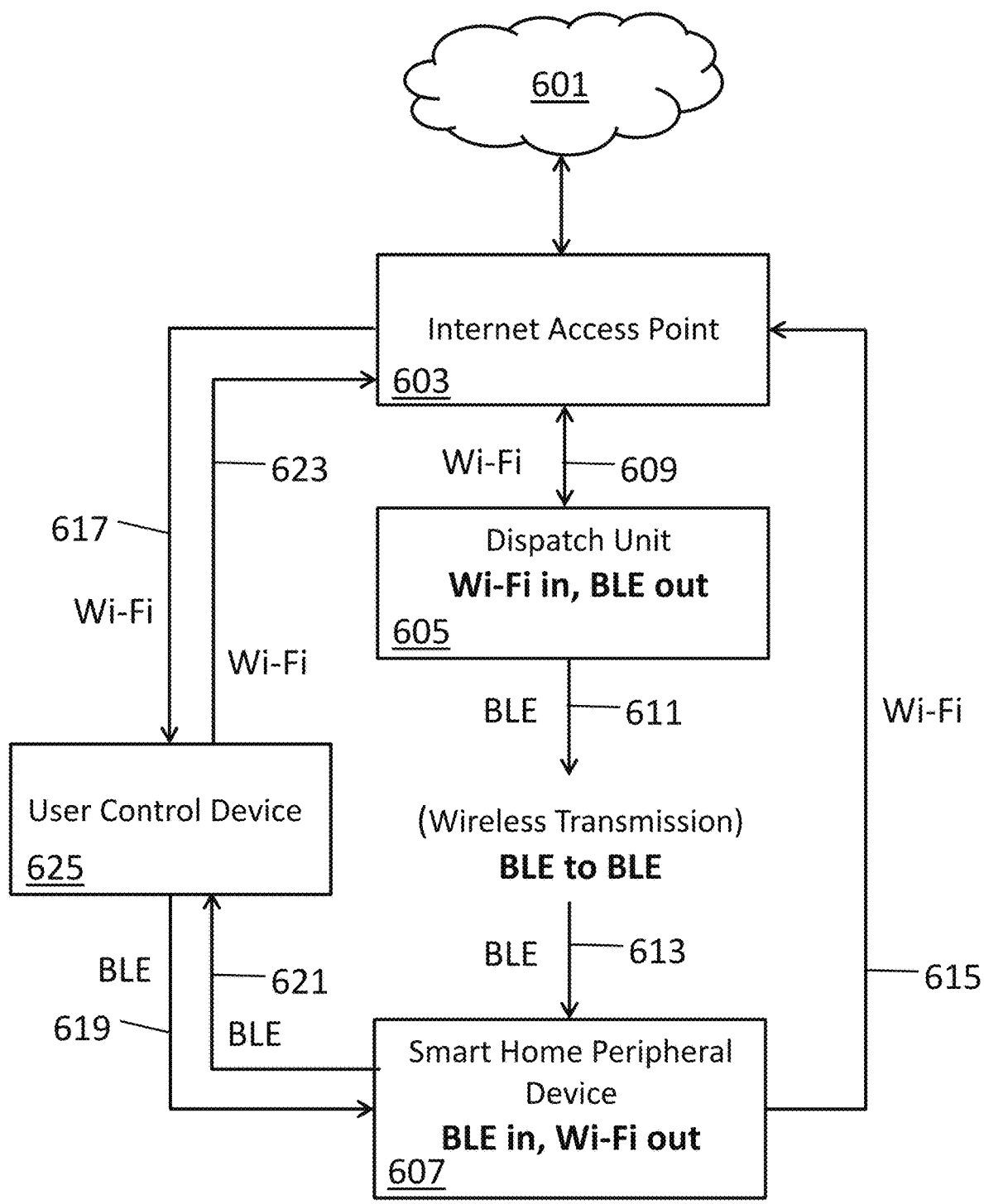
FIG. 6 depicts a block diagram of communication pathways corresponding to another example embodiment of a communications architecture consistent with the disclosure hereof.

In example embodiments as illustrated FIGS. 4, 5, and 6, it may be found useful to take fine-grained account of specific strengths and weaknesses of particular communications modalities so as to better match their capabilities to the unique requirements of the smart home environment. Some modalities, such as, for example, Wi-Fi, provide relatively high range and bandwidth, but at a cost of power consumption levels that are not practicable for battery-powered devices in some applications. Some modalities, such as, for example, BLE, provide greatly improved power consumption characteristics, but at the cost of limited range that may be inadequate to span the distances characteristic of a larger smart home environment, and/or bandwidth inadequate for some applications such as, for example, transmission of full motion/high resolution video. Thus, for example, in some embodiments such as depicted in FIG. 4 where the smart home environment includes an Internet access point 403 with connectivity to the cloud 401 to provide communication to and from an application running on a server and/or a user control device such as, for example, a smart phone, a wireless communication path between the Internet access point and a smart home peripheral device 407 can be provided wherein a communication 409 could be transmitted by Wi-Fi from the Internet access point to a dispatch unit 405, received and processed by the dispatch unit, a BLE communication 411 transmitted therefrom and received by a smart home peripheral device 407. The smart home peripheral device may perform some function and/or generate data and produce a communication 415 which may be transmitted by Wi-Fi directly to the Internet access point, thus implementing a Wi-Fi to BLE to BLE to Wi-Fi communication path from the Internet access point to the smart home peripheral device and back. In some embodiments, the Wi-Fi transmitter and/or related circuitry of the smart home peripheral device may be maintained in a default power-off state except when activated by an instruction received via a BLE protocol, thereby substantially reducing power consumption, as may be particularly desirable for battery-powered smart home peripheral devices, while maintaining the ability to communicate over the longer ranges and/or higher bandwidth provided by Wi-Fi when such capabilities are needed.

FIGS. 5 and 6 depict other example embodiments of communications paths. FIG. 5 depicts schematically a portion of a smart home environment including an Internet access point 503 having Internet connectivity 501. In this example embodiment, a Wi-Fi to BLE to BLE to Wi-Fi communication path is implemented wherein a Wi-Fi connection 509 is provided between the Internet access point and a dispatch unit 505, a communication received thereon by the dispatch unit is processed and an outgoing communication is transmitted 511 by the dispatch unit according to a BLE protocol and received 513 by a smart home peripheral device to which it is directed. The smart home peripheral device may perform a function and/or otherwise respond to the communication and thereupon transmit 515 a communication according to a Wi-Fi protocol, which is received 517 by the dispatch unit, optionally processed, and relayed via the Wi-Fi connection 509 with the Internet access point to an ultimate destination such as an application running on a cloud server, and/or a user control device.

FIG. 6 depicts schematically a portion of another embodiment of a smart home environment including an Internet access point 603 having Internet connectivity 601. In addition to or in lieu of the communication path as generally depicted in FIG. 4 wherein a communication 609 is relayed by Wi-Fi from the Internet access point to a dispatch unit 605, processing is performed and a BLE communication is transmitted 611 to be received 613 by a smart home peripheral device 607, and a responsive communication 615 is transmitted by Wi-Fi directly from the smart home peripheral device to the Internet access point, an alternate communication path may be provided availing of the capabilities of a user control device such as, for example, a smart phone, when such a device is present within wireless range of other devices within the smart home environment. Thus, for example, a user control device may be configured to communicate over a Wi-Fi connection 617, 623 with the Internet access point and via a BLE connection 619, 621 with a smart home peripheral device. An instruction directed to the smart home peripheral device could originate from a server application relayed through the Internet access point to the user control device via the Wi-Fi connection and thence via the BLE connection to the smart home peripheral device. The smart home peripheral device could, in response, transmit a BLE communication 621 back to the user control device, which could optionally be relayed to a server application via a Wi-Fi transmission 623 to the Internet access point and thence to the cloud, or could transmit a Wi-Fi communication 615 directly to the Internet access point. In some embodiments, where permitted by the position and range of devices and the available wireless communication functionality of devices, a user control device could be employed to transmit and/or receive instructions, data, status messages, and/or other messages of any useful type via any available protocol and/or modality and/or directly or indirectly to and/or from any smart home peripheral device(s), dispatch unit(s), Internet access point(s), or any other devices present in a smart home environment.

In some embodiments, devices are employed that are adapted and configured to receive one or more communications according to a first protocol and thereupon output one or more communications according to a second protocol, and/or to output one or more communications according to the first protocol and thereupon receive one or more communications according to the second protocol. In some embodiments a device may be adapted and configured to perform processing on a communication and/or a message embodied thereby, such as, for example, to reconfigure all or a portion of a communication and/or message to conform to a desired protocol, to combine all or a portion of a communication and/or message with other data, to assort a communication and/or message among packets, and/or in any other manner or for any other purpose(s) found useful for an application of interest. Such processing may be performed in hardware, software, firmware, logic circuitry, any combination thereof, or in any other operative manner. Although the foregoing discussion has focused on communications and messages specifically related to the implementation of the smart home functionality of the system, additional messaging and message content may typically be required such as, for example, for handshaking, establishment and termination of connections, status messaging, advertising, beaconing, and/or other communications overhead-related purposes. To facilitate description, communications paths have been described in terms of originating and ending with specific nodes or devices; however, communications could originate and/or be consumed at any desired point in a path.

In the foregoing disclosure, various wireless communications have been described as communications according to a Wi-Fi protocol or according to a BLE protocol. In embodiments, there may be substituted any other protocols and/or communications modalities operative to enable the indicated communications under whatever constraints may be present in the implementation context of interest. In general, in many embodiments wherein a Wi-Fi protocol or modality is described, there could be substituted any high-performance protocol or modality. A high performance protocol or modality could include any protocol or modality providing a range adequate for the distances involved in a smart home environment of interest, such as, for example, greater than 20 m, or greater than 30 m, or greater than 40 m, or greater than 75 m, or greater than 100 m, and/or bandwidth adequate for transmission of data as may be required by an ordinarily demanding data exchange, such as bandwidth of at least about 1 Mbps, or about 5 Mbps, or about 11 Mbps, or about 20 Mbps, or about 54 Mbps, or about 100 Mbps, or about 200 Mbps, or about 300 Mbps. Examples of high-performance protocols or modalities could include Wi-Fi, WiMAX, and IEEE 802.11 protocols. Similarly, in many embodiments wherein a BLE protocol or modality is described, there could be substituted any reduced energy protocol. Reduced energy protocols could include any of the current or future wireless modalities or protocols recognized by persons of skill in the art as low energy or low-power-demand protocols, such as, for example, Bluetooth, Bluetooth Low Energy (BLE), Zigbee, Z-wave, Ant, and passive Wi-Fi. A reduced energy wireless communication modality or protocol could include any current or future wireless modalities or protocols providing bandwidth at least adequate for transmitting activation messages, such as bandwidth of at least about 0.5 Kbps, or about 1 Kbps, or 2 about Kbps, or 5 about Kbps, and having receiver or transceiver power demand less than about 150 uA, or less than about 100 uA, or less than about 75 uA, or less than about 50 uA in a non-transmitting (except for required handshaking and/or advertising) and continuous monitoring or scanning mode (which may include modes wherein the transceiver is maintained in a reduced power state and a channel is monitored for messages at short predetermined intervals such as less than about 500 ms, or about 300 ms, or about 200 ms, or about 100 ms, or about 50 ms, or about 25 ms, or about 10 ms, or about 1 ms).

In some embodiments it may be found useful in a home automation system architecture to employ a device-agnostic messaging architecture for communication to, from, and/or with one or more devices with which the system is desired to interact, and/or between devices. A device-agnostic messaging architecture may include any communication modality and/or protocol employing a message packet whereby the messaging is not device-specific, and/or is operable to communicate to and/or from and/or between two or more devices manufactured by different manufacturers, belonging to different home automation device families, representing different brands, and/or having different functionality. A device-agnostic messaging architecture may include any communication modality and/or protocol operable for interaction and/or control by or within a home automation system manufactured and/or sold by a first provider and/or brand, of or with one or more devices manufactured and/or sold by a second provider and/or brand. In embodiments, a device-agnostic messaging architecture may be adapted and configured for compatibility with more than one wireless communication protocol; for example, a device-agnostic messaging architecture may utilize packets that are compatible for communication according to either a Wi-Fi or BLE protocol, and/or wherein a packet received according to one protocol is suitable for transmission according to a different protocol, without requiring modification. Disclosed herein are embodiments of systems, devices, and methods useful for implementation of device-agnostic messaging architectures for smart home systems.

Figure 7:
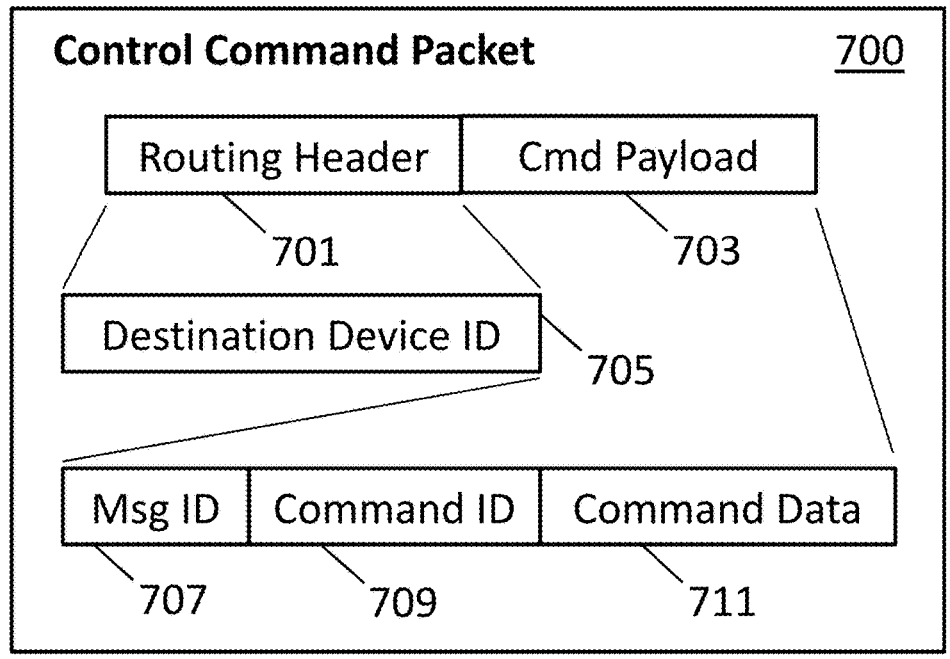
FIG. 7 depicts an embodiment of a smart home system control command packet design consistent with the disclosure hereof.

FIG. 7 depicts schematically an exemplary embodiment of a general form of control command packet 700 useful for wireless communication to and from various devices of a smart home system. The packet includes two top-level fields as shown: a routing header field 701 and a command payload field 703. The routing header field may contain at least a destination device identifier 705, which may include any identifier operable to permit any devices receiving a packet to determine whether the packet is addressed to the receiving device. In embodiments, a destination device identifier may typically include a binary or hexadecimal string unique to the device, such as, for example, a MAC address. The routing header field may contain encodings of any other information found useful for an application of interest. The command payload field may contain a message identifier 707, a command identifier 709, and may include command data 711. A message identifier may include and/or encode any information found useful for identifying the message being transmitted. A command identifier may include and/or encode data such as, for example, a binary or hexadecimal string, uniquely identifying the command, function, or operation to which the message pertains. The command data field may contain any data found useful in connection with the command, function, and/or operation of the addressee device, or may be omitted, padded with zeros, or otherwise left blank in cases where transmission of data is not needed. Each of the fields of a control command packet may be of any length found useful for transmission of the indicated subject matter and compatible with the packet sizes and requirements of any communication protocol with which a packet is to be employed. It will typically be found useful to employ fields of fixed length in the routing header field and optionally in the various identifier fields, so as to avoid the complexity and tailed by variable in fields. In some embodiments, it may be found desirable to employ variable length fields, such as for data fields, so as to accommodate data of varying or unpredictable length; this may be accomplished, for example, by including a separate field indicating the length or ending address of a variable length data item.

Figure 8A:
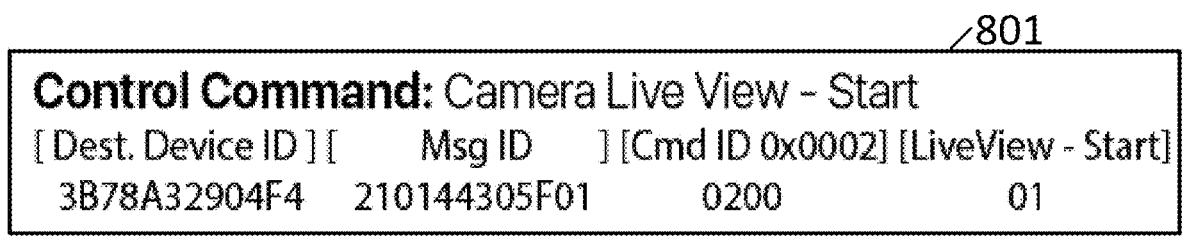
FIG. 8A depicts an example embodiment of a smart home system control command packet consistent with the disclosure hereof.
Figure 8B:
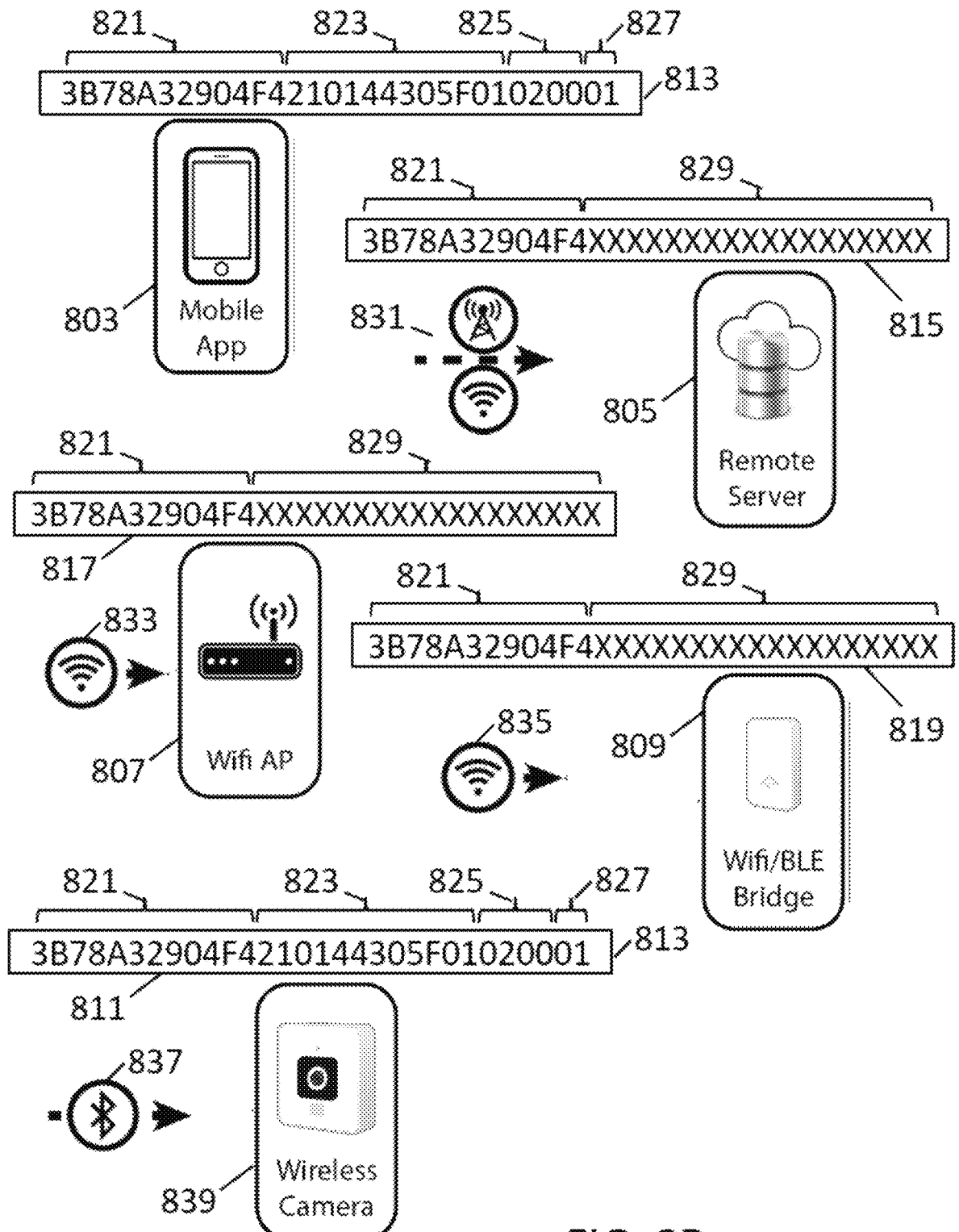
FIG. 8B depicts a block diagram illustrating an example embodiment of the communication of a smart home system control command packet over a communication path consistent with the disclosure hereof.

FIGS. 8A and 8B depict an example embodiment of a communication of a control command packet originating from a mobile application running on a smart phone and relayed to a smart home wireless camera peripheral device via a communications architecture as disclosed herein. The packet structure 801 is depicted in FIG. 8A. As illustrated in FIG. 8B, the mobile application 803 generates a packet 813 having a header field 821 containing a unique 12-digit hexadecimal destination device identifier, and a command payload field containing a 12-digit hexadecimal message identifier 823, a four hexadecimal digit command identifier 825, and a two digit start code 827. The control command packet is incorporated into a communication suitable for transmission 831 to a remote server 805 via a cellular network connection, a Wi-Fi connection, or any other operable modality. The remote server may receive the transmission, extract the control command packet 815 and determine, based upon the destination device identifier 821 and without a need to reference or interpret the command payload field 829, a routing suitable for conveying the control command packet to the specified destination device. In this example embodiment, the remote server relays 833 the control command packet 817 unchanged to a Wi-Fi enabled wireless access point 807 present in the smart home environment. From the wireless access point the control command packet 819 is packaged and transmitted 835 by Wi-Fi to a device such as, for example, a dispatch unit 809 adapted and configured to repackage and transmit 837 the control command packet by BLE whereby the packet 813 is received by the smart home wireless camera peripheral device 839 corresponding to the specified destination device identifier, which may extract the command payload portion of the control command packet, interpret the content of the command payload field to determine that the command identifier corresponds to activation of the wireless camera and the command data corresponds to operating the wireless camera to an "on" state, and activate and operate the smart home wireless camera peripheral device accordingly.

Figure 9B:
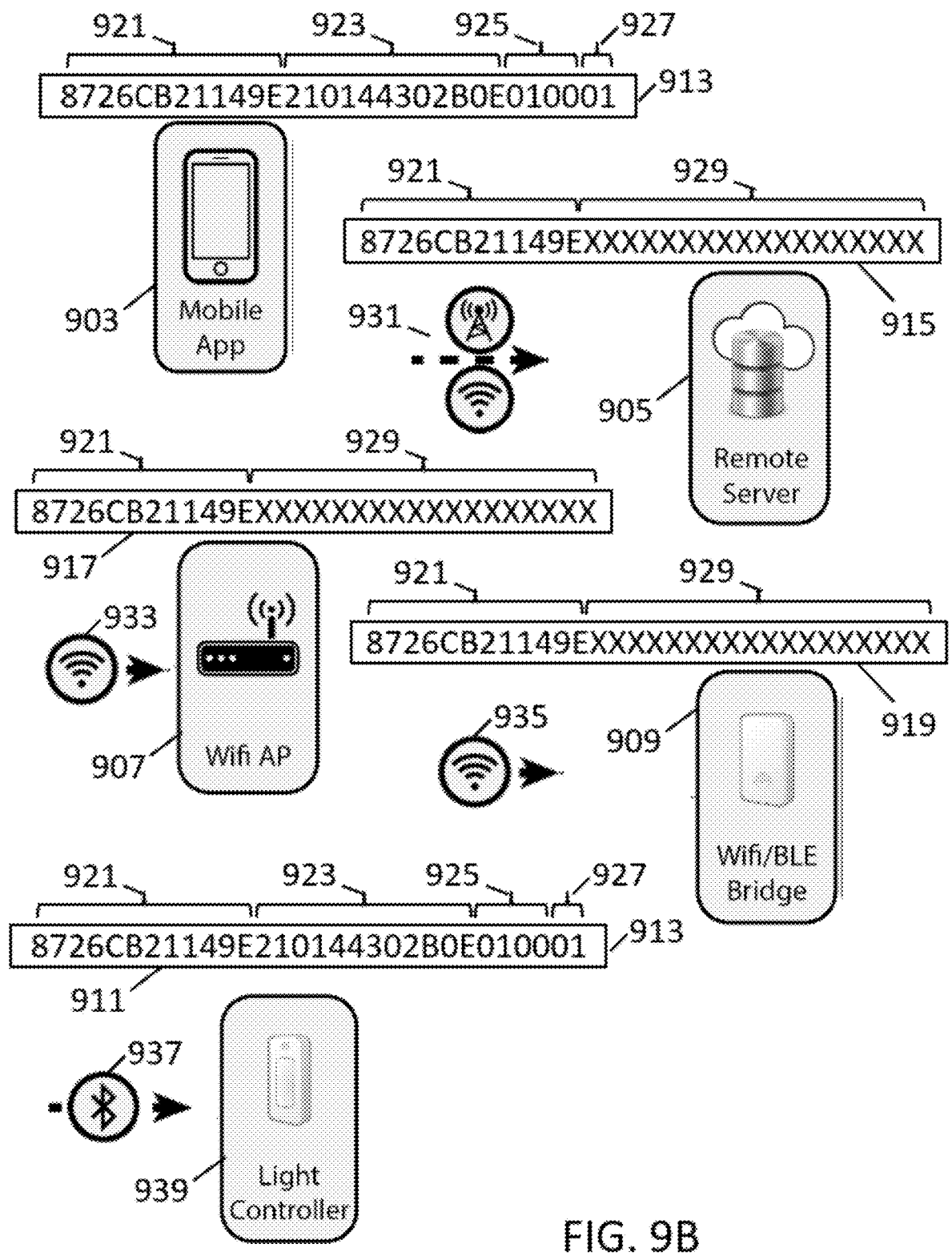
FIG. 9B depicts a block diagram illustrating an example embodiment of the communication of a smart home system control command packet over a communication path consistent with the disclosure hereof.

FIGS. 9A and 9B depict an example embodiment of a communication of a control command packet originating from a mobile application running on a smart phone and relayed to a smart home light controller peripheral device including a mechanical actuator-type functional unit and adapted and configured to operate a switch such as, for example, an ordinary light switch or dimmer control, in response to a command relayed via a communications architecture as disclosed herein. The packet structure 901 is depicted in FIG. 9A. As illustrated in FIG. 9B, the mobile application 903 generates a packet 913 having a header field 921 containing a unique 12-digit hexadecimal destination device identifier, and a command payload field containing a 12-digit hexadecimal message identifier 923, a four hexadecimal digit command identifier 925, and a two digit start code 927. The control command packet is incorporated into a communication suitable for transmission 931 to a remote server 905 via a cellular network connection, a Wi-Fi connection, or any other operable modality. The remote server may receive the transmission, extract the control command packet 915 and determine, based upon the destination device identifier 921 and without a need to reference or interpret the command payload field 929, a routing suitable for conveying the control command packet to the specified destination device. In this example embodiment, the remote server relays 933 the control command packet 917 unchanged to a Wi-Fi enabled wireless access point 907 present in the smart home environment. From the wireless access point the control command packet 919 is packaged and transmitted 935 by Wi-Fi to a device such as, for example, a dispatch unit 909 adapted and configured to repackage and transmit 937 the control command packet by BLE whereby the packet 913 is received by the smart home peripheral light controller device 939 corresponding to the specified destination device identifier, which may extract the command payload portion of the control command packet, interpret the content of the command payload field to determine that the command identifier corresponds to operating the light controller functional unit and the command data corresponds to operating a light switch to an "on" position, and activate and operate the smart home light controller peripheral device accordingly.

In some embodiments the communications architecture disclosed herein may be usefully employed to accommodate the inclusion of non-native devices in a smart home ecosystem. Non-native devices may include any device not belonging to the product line intended for inclusion in the smart home system by the manufacturer of the smart home system, such as, for example, a device manufactured by a competing manufacturer, a hobbyist device, or a legacy device or other device not designed for inclusion in a smart home system. Because the communications architecture disclosed herein supports device-agnostic communications, in some embodiments, for example, a non-native device may be included in the smart home system, an application or software for controlling and/or communicating with the non-native device may be installed on a server such as a server controlling and/or managing the smart home system, and the application or software may thereby be enabled to control and/or communicate with the non-native device via the same communications architecture as the rest of the smart home system. Because there is no need for the intermediate devices through which a communication is relayed to interpret or decode the payload portion of a message packet, communication between the server application and the smart home peripheral device is enabled to take place regardless of the possibly proprietary content or encoding of the communication.

Figure 10A:
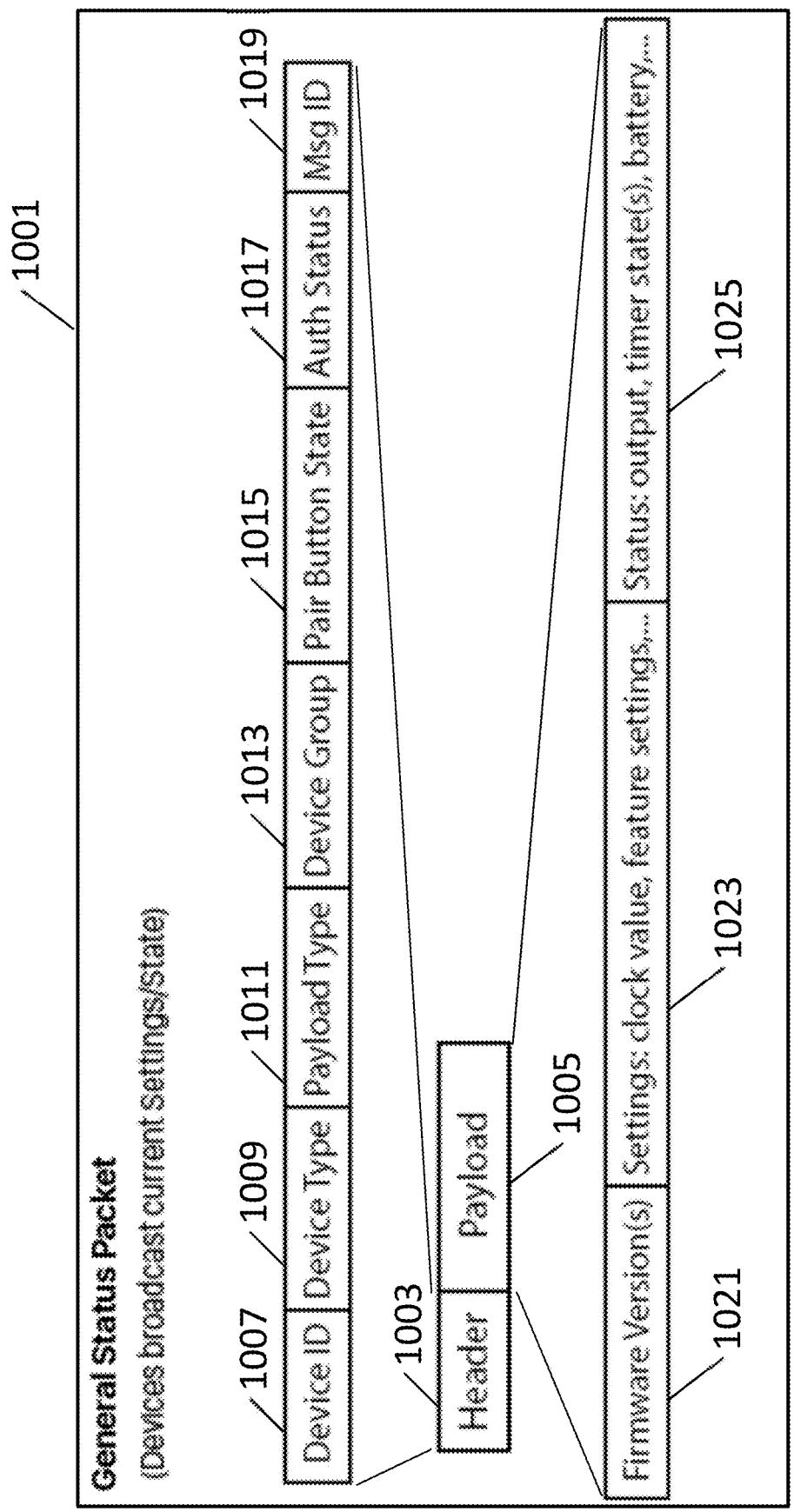
FIG. 10A depicts an example embodiment of a smart home system general status packet design consistent with the disclosure hereof.
Figure 10C:
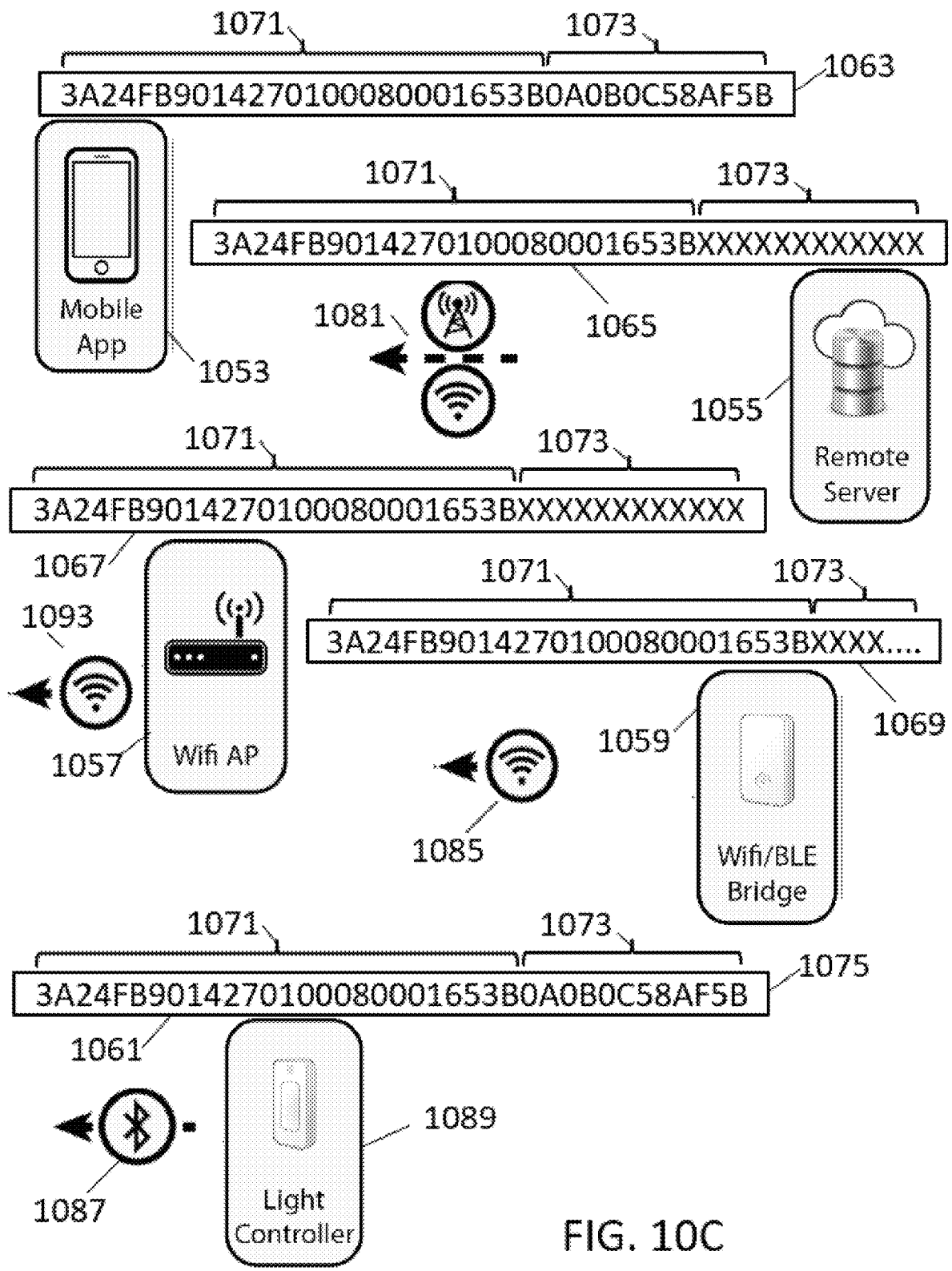
FIG. 10C depicts a block diagram illustrating an example embodiment of the communication of a smart home system general status packet over a communication path consistent with the disclosure hereof.

FIGS. 10A, 10B, and 10C depict an example embodiment of a communication of a general status packet originating from a smart home light controller peripheral device including a mechanical actuator-type functional unit and adapted and configured to operate a switch such as, for example, an ordinary light switch or dimmer control, and relayed to a mobile application running on a user's smart phone or other user control device via a communications architecture as disclosed herein. In general, a general status packet may be broadcast by a device such as, for example, a smart home peripheral device, and may encode information about the status of the device, such as, for example, whether or not the device is currently activated or operating, the values of any parameters of interest, whether any error, alert, or other exception state exists, acknowledgement of a command or other communication, or any other information found useful for an application for which the device is adapted. In embodiments, a general status packet may be relayed to a destination, such as, for example, a cloud server, over any operable communication path, such as, for example, via one or more hubs or dispatch units. The packet structure 1001 is depicted in FIG. 10A. in this illustrative embodiment, a general status packet 1001 includes a header field 1003 and a payload field 1005. The header field includes subfields for a device identifier 1007 identifying the device whose status is to be relayed, and for codes for device type 1009, payload type 1011, device group 1013, pair button state 1015, authorization status 1017, and message identifier 1019. The payload field includes subfields for firmware version 1021, settings 1023, and status codes 1025. FIG. 10B illustrates an example general status packet conforming to the foregoing packet structure. As illustrated in FIG. 10C, the smart home light controller peripheral device 1089 generates a packet 1075 having a header field 1071 containing a unique 12 digit hexadecimal destination device identifier, two digit codes for device type, payload type, device group, pair button state, and authorization status, and a four hexadecimal digit subfield for message identifier, and a payload field 1073 containing a six hexadecimal digit subfield for firmware version, a four digit subfield for settings, and a two digit subfield for status, all as illustrated in FIG. 10B. the general status packet is packaged into a communication suitable for transmission 1087 by BLE to a device such as, for example, a dispatch unit 1059 adapted and configured to repackage and transmit 1085 the general status packet by Wi-Fi whereby the packet 1069 is received by a Wi-Fi enabled wireless access point 1057 present in the smart home environment. From the wireless access point the general status packet 1067 is packaged and relayed to a remote server 1055 such as, for example, a cloud server running a smart home management application. After the packaging and optionally performing processing on or in response to the general status packet, the remote server application may optionally issue instructions and/or transmit other data to any devices of the smart home system, and may repackage the general status packet 1065 into a communication suitable for transmission 1081, which may be via Wi-Fi, Bluetooth, a cellular telephone network, or any other operable communication modality, for receipt and decoding or interpretation of the general status packet 1063 by the user's smart phone or other user control device and/or an application running thereon. In some embodiments, once the payload field is encoded by the originating device (here, the smart home light controller peripheral device 1089), the payload field need not be accessed or interpreted or decoded by any of the intermediate devices, but instead may be relayed intact and without change to the ultimate receiving device(s) (in this example, the remote server application 1055, the smart phone application 1053, or both). In embodiments, the foregoing packet and communications path architectures provide a scaffolding whereby a smart home management application running on a user's smart phone or other user control device may operate in cooperation with a smart home management application running on a remote server (and optionally adapted and configured to provide communications and management of multiple smart home installations for multiple customers) can maintain continuous monitoring of the status of all of the smart home peripheral devices belonging to the system, and generate instructions and process data as may be appropriate to carry out the operations desired by users.

In embodiments, a system may be adapted and configured to take particular advantage of the capabilities of any communication protocol that provides for advertising functionality so as to provide for continuous monitoring of the status of the entire system by a central entity such as a server. Without limiting the generality of the foregoing, by way of example, such functionality could be employed in a smart home system including one or more smart home peripheral devices, a server such as, for example, a computer accessible over the internet and running software operable to communicate with and control the smart home system and/or smart home peripheral devices; and a dispatch unit for relaying and optionally decoding and/or encoding communications between the server and smart home peripheral device(s), wherein the dispatch unit and smart home peripheral device(s) are adapted and configured to communicate according to a BLE protocol. The BLE protocol provides functionality whereby peripheral devices may, without first establishing a connection, broadcast advertising and/or scan response packets at a specified interval, which other devices may use to discover the presence of the advertising device and thereupon initiate communications to establish a data connection. However, establishment of a connection entails additional complexity, overhead, and power consumption, and a novel aspect of the system disclosed herein is the avoidance of these disadvantages by piggybacking status and/or condition information onto the advertising communications. Thus, for example, a peripheral device may communicate information regarding device status and/or conditions by encoding status and/or condition information in the BLE advertising packets themselves, such as in portions of the packets that are otherwise unused or whose functionality is not needed for the functioning of the system, thereby providing continuous reporting of status condition which the dispatch unit and/or server may monitor at will without incurring the costs and overhead required to establish and/or maintain connections with each device. In this way, in embodiments, a server may be enabled to maintain a continuous representation of the status and/or conditions of the entire system, since potentially all the peripheral devices can be configured for continuous broadcasting of status/condition information in this way. In some embodiments wherein the desired status/condition information is too voluminous to be encoded in a single BLE advertising packet, the advertising packets may be modified to encode a signal that additional continuation packets will be transmitted, and these too may be transmitted in a connectionless manner and assembled and/or decoded by a dispatch unit, server, or other suitable component. In some embodiments where additional information is desired to be conveyed a connection can of course be established and data transmitted via a BLE data channel.

In embodiments of a smart home communications architecture, a smart home peripheral device may be adapted and configured to broadcast advertising packets which may be dynamically alterable in response to an event and/or change in condition of a smart home peripheral device. In an embodiment, for example, a smart home peripheral device comprising a door or window sensor could operate by broadcasting advertising packets, such as, for example, augmented BLE advertising packets, in which are encoded the open or closed state of the door or window. In this way the smart home system is enabled to continuously monitor the state of the door or window entirely via connectionless communications, without a need for establishing a data channel. In embodiments, a smart home peripheral device may be adapted and configured to transmit, and other devices in the system may be adapted and configured to receive, advertising packets, including, for example, augmented BLE advertising packets, whose augmented and/or encoded content may be altered over time to reflect any events, changes in condition, or other information, and in any manner found useful for an application of interest.

Thus, for example, in an embodiment as depicted in FIG. 3, a smart home peripheral device 303 may be adapted and configured to continuously broadcast in a connectionless manner, at predetermined intervals, augmented BLE advertising communications in which is encoded information regarding the status and/or conditions relating to the smart home peripheral device and/or the context in which it is deployed. The augmented BLE advertising communications could be received 329 by a smart phone, and decoded and/or relayed directly 311 or indirectly 317, 313 to a cloud server 309 or other control device, or could be received 333 by a dispatch unit 305 and decoded and/or relayed 319, 313 to a cloud server or other device. Upon suitable commands or instructions from the cloud server, dispatch unit, smart phone, or other control device, a BLE connection and data channel could be established for further communication if needed for an application of interest, and/or the cloud server or other control device could continue to monitor the status/condition of the smart home peripheral device via the augmented advertising communications.

Many variations of the foregoing embodiments and examples are possible and encompassed by this disclosure. In some embodiments, communications transmitted by a smart home peripheral device may be received directly, without relay through a router, wireless internet access point, server, or other network, by any wireless receiver-equipped device compatible with a protocol used by the peripheral device for transmission and within wireless range of the peripheral device, such as, for example, a user's smart phone, tablet, or personal computer provided with a compatible receiver or other data consuming device. In some embodiments, a communication may be transmitted directly to a dispatch unit or directly to a smart home peripheral device from another compatible device within range, such as, for example, a user's smart phone, tablet, or personal computer, or a sensor device or alert device, provided with a compatible transmitter. When communications and/or signals are relayed or transmitted, they may be passed on in the same form, or processed, supplemented, edited, re-created in a different form, and/or repackaged for transmission under a different protocol at any point, in any manner found useful for an application of interest. The disclosed systems and their component devices need not necessarily be implemented in the specific functional units organized as disclosed herein; rather, components may be integrated, combined, modularized, or otherwise arranged in any manner operable to provide the disclosed functionality. In some embodiments, although a power-off state will generally be preferred for optimal power conservation, the default state of a wireless data transmitter of a peripheral device could be a quiescent state other than a power-off state, such as in applications where power conservation constraints are less demanding.

In embodiments, there may be provided applications, which may be implemented in software, hardware, firmware, logic circuitry, or any combination thereof, which may provide functionality for user interaction with a smart home system and/or any subsystem and/or smart home peripheral devices thereof, via a smart phone, tablet, personal computer, or other device. For example, an application may be configured to display a user interface offering a user the option to operate a smart home peripheral device, and upon selection of that function by the user, communicate a message to a server for relaying to a dispatch unit and thence to the smart home peripheral device. An application may be configured to display or otherwise output to a user an alert message originating from an alert device, and/or a message informing the user of the status of a smart home peripheral device. An application may be configured to offer a user functionality to display data transmitted by a smart home peripheral device, such as for example, status data, video data, and/or audio data. An application may be configured to provide a user interface for control by a user of any functionality of any smart home peripheral device or any other device or component of a smart home system.

In embodiments, a smart home system may include one or more smart home peripheral devices, each of which may include a wireless receiver operable on a BLE or other wireless protocol, a controller for detecting an instruction signal received by the wireless receiver, and a functional unit controllable by the controller to perform a function in response to an instruction signal received via the wireless receiver. In embodiments, a functional unit could include any device, component, structure, circuitry, or combination thereof for controlling, monitoring, and/or interacting with a smart home ecosystem or any aspect thereof. In some embodiments, functional units may include modules, actuators, controls, sensors and/or other components adapted and configured to engage with existing user controllable fixtures present in a home, office, or other environment of interest, and to interact with the existing user controllable fixtures so as to operate and/or control them, thereby in turn controlling and/or operating one or more appliances and/or devices that interface with the existing user controllable fixtures. In embodiments, the user controllable fixtures may include any of the many components and/or fixtures commonly found in a home, office, or other environment, such as, for example, light switches, light dimmers, rheostats, electrical receptacles, motor controls, thermostats, heating, cooling, and/or ventilation controls, intrusion, fire and/or other alarm controls, irrigation and/or sprinkler controls, drape, window, and/or shutter controls, door and window locks, and appliance controls. In embodiments, the instruction signal may be transmitted to the peripheral device by a dispatch unit.

In embodiments, the components of a dispatch unit, smart home peripheral device, and/or any other component of a smart home system or video subsystem, may be assembled and/or constructed in any manner and using any additional components and/or fabrication technology found advantageous for an application of interest. In some typical embodiments, by way of example only, a functional module or other component and its related circuitry could be disposed on a printed circuit board mounted in a housing. A functional module, transceiver, power source, and/or other component(s) could be implemented as circuitry on the same printed circuit board, or as separate modules mounted thereto or connected therewith in any operable manner. In some embodiments component(s) may be implemented in whole or part as integrated circuits. In some embodiments two or more components may be integrated in a single module or apparatus, optionally with sharing of some elements, in any manner operable for the intended functionality; for example, two or more components could be integrated in a single module or component using a shared power source.

In some embodiments, signals may be relayed through a repeater or range extender which may be employed to increase the range of distances over which the system can reliably operate. In some embodiments the repeater or range extender and/or dispatch unit could be employed to retransmit a signal in a modality different from the modality in which the signal is received, such as, for example, receiving a signal on a BLE channel and re-transmitting it on a Wi-Fi channel or vice versa. In some embodiments, the range of a low power channel, such as, for example, a BLE channel, may be extended by providing an amplifier to amplify the transceiver, by utilizing MESH technology where one or more other devices in the system acts as a repeater, by including in the system one or more bridges (such as, for example, a Wi-Fi/BLE bridge that acts as a repeater and/or range extender and also may convert BLE signals to Wi-Fi for outbound communication to the cloud and vice versa for inbound communications from the cloud), or by any combination of any of the foregoing. In some embodiments all of the foregoing strategies may employed together thereby providing triple redundancy.

In some embodiments, automation devices and/or smart home peripheral devices may be adapted and configured to be installed in physical engagement with user controllable fixtures already present in the environment of interest, and to control and/or operate the existing user controllable fixtures by physical manipulation thereof. In some embodiments, any of such peripheral devices may be adapted and configured to respond to control signals received from a dispatch unit via BLE wireless transmissions and perform a function and/or activate a functional unit in response thereto. In some embodiments, the smart home peripheral devices are adapted and configured to interface physically with the existing user controllable fixtures and control and/or operate the existing user controllable fixtures without the necessity of any modification to or disassembly of the latter. In some embodiments, a smart home peripheral device may be provided with one or more user controls for use in controlling and/or operating the automation device directly and could thereby in turn control and/or operate an existing user controllable fixture with which the smart home peripheral device is associated and/or interfaced. In embodiments, user controls may include any of the many components and devices used for controlling electrical, electronic, and/or electromechanical devices, such as, for example, buttons, levers, switches, dials, sliders, touch screens, and keypads, and may be disposed in or on the smart home peripheral device and/or may smart home peripheral an automation device remotely such as, for example, in response to one or more signals from a remote control, remote keypad, console, computer, or cellular phone.

In embodiments, a smart home peripheral device and/or a housing in which it is disposed may be adapted and configured for mounting via a self-affixing attachment, which may include any attachment modality operable to establish an engagement between the smart home peripheral device and a controllable fixture, having adequate strength upon placing the smart home peripheral device in position and optionally applying pressure, making minor positional adjustments to the smart home peripheral device or a part or component thereof, or otherwise securing the smart home peripheral device in position without the use of tools and without modifying, removing, or disassembling the controllable fixture or any part thereof. In embodiments, self-affixing attachments may include one or more self-affixing fasteners, such as, for example, hook and loop fasteners, magnets, adhesive strips, micro suction cup pads, silicone adhesive pads, double-sided adhesive tape, 3M command tape, spring clips, gripper clips, adhesive or sticky clay, adhesive backings, and/or liquid or gel adhesives. In embodiments, self-affixing fasteners of more than one type may be employed in combination. In embodiments of smart home peripheral devices, it may be found useful to employ attachments that are releasable, which may include any attachment whereby the smart home peripheral device is removable from its engagement with the controllable fixture by application of outward and/or transverse pressure alone, or by application of outward and/or transverse pressure accompanied by release of one or more spring clips or gripper clips if present, and whereby the normal operability of the existing controllable fixture is restored by such removal. In embodiments, releasable attachments could be implemented by the use of releasable fasteners, such as, for example, hook and loop fasteners, magnets, micro suction cup pads, and spring clips as well as adhesives such as, for example, silicone adhesive pads, adhesive strips, double-sided adhesive tape, adhesive clay, adhesive backings, and/or liquid or gel adhesives, that are formulated to be releasable and/or non-hard curing. Thus, an example of an embodiment of a smart home peripheral device could include a light switch automation device including a housing having a self-affixing releasable attachment for affixing the housing in position over a light switch; an actuator located within the housing, and configured to actuate a lever of the light switch once the light switch automation device has been placed on the light switch cover plate; and a microcontroller located within the housing and configured to control the actuator; and could include a BLE-compatible receiver for receiving a control signal from a dispatch unit.

CONCLUDING MATTER

The disclosed methods, systems, devices, apparatus, compositions, articles of manufacture, and improvements thereof have been explained above with reference to several embodiments. Other embodiments will be apparent to those skilled in the art in light of this disclosure. Certain aspects of the described subject matter may readily be implemented using configurations other than those described in the embodiments above, or in conjunction with elements other than those described above. For example, different components, algorithms and/or logic circuits, perhaps more complex than those described herein, may be used.

It should also be appreciated that the described subject matter can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the disclosed subject matter is described with reference to specific embodiments thereof, but those skilled in the art will recognize that the invention is not limited thereto. Various features and aspects of the above-described subject matter may be used individually or jointly. Further, the described subject matter can be utilized in any number of environments and applications beyond those described herein without departing from the broader spirit and scope of the specification. The specification and drawings are, accordingly, to be regarded as illustrative rather than restrictive.

In the foregoing disclosure, specific functions may be attributed to specific components or modules. It will be apparent that the functional boundaries between components or modules are substantially artificial; functionality attributed to two or more modules or components could equivalently be combined in a single module or component, and functionality attributed to a single module or component could equivalently be divided between two or more modules or components. The disclosure hereof extends to all such equivalent arrangements.

Except as otherwise specifically stated or required by context, directional terms are not intended to be limiting or to imply that the apparatus or object must be used in any particular position or orientation.

In embodiments, components and/or substructures described herein as having fixed positions relative one to another may be held in position in any manner operable to maintain the specified positions under conditions of normal use as described herein, such as, by way of example only, by the use of mechanical fasteners such as bolts, screws, nuts, or rivets; by heat, such as, for example, welding, brazing, or soldering; by an adhesive; by incremental deposition, such as, for example, by 3D printing; and/or by forming a component integrally or as a single piece with another component. In embodiments, components and/or substructures described herein as having movable positions relative one to another may be constrained in position in any manner operable to constrain the components and/or substructures within the specified ranges of positions under conditions of normal use as described herein, such as, by way of example only, by the use of mechanical fasteners such as hinges, sliders, tracks, followers, pivots, bearings, and/or flexible components. Unless otherwise specifically stated or required by context, mounting and/or affixation may be permanent or removable or removable and replaceable, as deemed useful for an application of interest.

For clarity and to ensure completeness, certain of the aspects and/or embodiments disclosed herein may be overlapping in scope, described repetitively, or represent recitals of the same or equivalent elements or combinations expressed in alternative language. It will be apparent that the choice of particular phraseology and/or of particular aspects or elements to assert as claims involves many complex technical and legal considerations, and no inference should be drawn that alternative descriptions of a particular element or combination in this written description necessarily do or do not encompass different subject matter; except where context otherwise requires, each described aspect or element should be interpreted according to its own description.

It is intended that this specification be interpreted in accordance with the normal principles of English grammar and that words and phrases be given their ordinary English meaning as understood by persons of skill in the pertinent arts except as otherwise explicitly stated. If a word, term, or phrase is intended to be further characterized, specified, or narrowed in some way, then additional adjectives, modifiers, or descriptive text have been included in accordance with the normal principles of English grammar. It is intended that the meanings of words, terms, or phrases should not be modified or characterized in a manner differing from their ordinary English meaning as understood by persons of skill in the relevant arts except on the basis of adjectives, modifiers, or descriptive text that is explicitly present.

Except as otherwise explicitly stated, terms used in this specification, including terms used in the claims and drawings, are intended as "open" terms. That is, for example, the words "including" and "comprising" should be interpreted to mean "including but not limited to," the word "having" should be interpreted to mean "having at least," the word "includes" should be interpreted to mean "includes but is not limited to," the phrases "for example" or "including by way of example" should be interpreted as signifying that the example(s) given are non-exhaustive and other examples could be given, and other similar words and phrases should be given similar non-exclusive meanings. Except as explicitly stated, ordinals used as adjectives (e.g. "first object", "second object", etc.) in this specification, including claims and drawing figures, are intended merely to differentiate and do not imply that any particular ordering is required. Thus, for example, unless otherwise explicitly stated, "first measurement" and "second measurement" do not imply that the first measurement necessarily takes place before the second measurement, but merely that they are distinct measurements.

In the written description and appended claims, the indefinite articles "a" and/or "an" are intended to mean "at least one" or "one or more" except where expressly stated otherwise or where the enabling disclosure requires otherwise. The word "or" as used herein is intended to mean "and/or", except where it is expressly accompanied by the word "either", as in "either A or B". Applicants are aware of the provisions of 35 U.S.C. § 112(f). The use of the words "function," "means" or "step" in the written description, drawings, or claims herein is not intended to invoke the provisions of 35 U.S.C. § 112(f), to define the invention. To the contrary, if the provisions of 35 U.S.C. § 112(f) are sought to be invoked, the claims will expressly include one of the exact phrases "means for performing the function of" or "step for performing the function of". Moreover, even if the provisions of 35 U.S.C. § 112(f) are explicitly invoked to define a claimed invention, it is intended that the claims not be limited only to the specific structure, material or acts that are described in the preferred embodiments, but in addition, extend to any and all structures, materials or acts that perform the claimed function as described in alternative embodiments or forms of the invention, or that are well known present or later-developed equivalent structures, material or acts for performing the claimed function.

Any of the methods of the present disclosure may be implemented in whole or part in hardware, software, or both, or by a computer program, and may be carried out using any of the disclosed devices or apparatus according to any aspect or embodiment of the present invention, or in any other operable manner. Where reference is made to an "application" in the context of a program for a computing device, application may be implemented in software, hardware, firmware, digital logic circuitry, analog circuitry, or any operable combination thereof, which persons of skill in the art will recognize as functionally equivalent.

In the foregoing description, various details, specific aspects, embodiments, and examples have been described in order to illustrate and explain the subject matter, to provide a thorough understanding of the various aspects, to enable persons skilled in the pertinent arts to practice the described subject matter, and to disclose the best mode of doing so known to applicants. These details, specific aspects, embodiments, and examples are not intended to be limiting; rather, it will be apparent to persons of skill in the relevant arts that, based upon the teachings herein, various changes, substitutions, modifications, rearrangements, may be made and various aspects, components, or steps may be omitted or added, without departing from the subject matter described herein and its broader aspects. Except as otherwise expressly stated or where aspects or features are inherently mutually exclusive, aspects and features of any embodiment described herein may be combined with aspects and features of any one or more other embodiments. Titles, headings, and subheadings herein are intended merely as a convenience for locating content, and do not limit or otherwise affect the interpretation of the content of the disclosure. The appended claims are intended to encompass within their scope any and all changes, substitutions, modifications, rearrangements, combinations of aspects or features, additions, and omissions that are within the spirit and scope of the subject matter as described herein and/or within the knowledge of a person of skill in the art. The scope of the invention is defined by the claims, and is not limited by or to the particular embodiments or aspects chosen for detailed exposition in the foregoing description, but rather extends to all embodiments or aspects as defined by the claims, as well as any equivalents of such embodiments or aspects, whether currently known or developed in the future.

We claim:

1. A system for management of a smart home environment comprising
    an internet access point in communication with a server, the system comprising:

a dispatch unit and a smart home peripheral device, the smart home peripheral device comprising a functional unit, wherein the dispatch unit comprises:
(a) a receiver adapted and configured to receive from the server via the internet access point a first wireless communication comprising a message directed to the smart home peripheral device;
(b) an interface adapted and configured to produce from the first wireless communication a message packet comprising at least a portion of the message; and
(c) a transmitter adapted and configured to transmit a second wireless communication comprising the message packet, wherein the message packet comprises:
(a) a header portion comprising a device identifier designating an address of the smart home peripheral device to which the message is directed; and
(b) a payload portion comprising an instruction to the smart home peripheral device designated by the device identifier, wherein the instruction is selected from:
(i) an operating instruction to operate the functional unit of the smart home peripheral device,
(ii) a control instruction to control a status condition or settings of the smart home peripheral device, and
(iii) a status instruction to transmit a communication comprising the status condition of the smart home peripheral device, wherein the smart home peripheral device is adapted and configured to receive the second wireless communication comprising the message packet, and thereupon to operate in accordance with the instruction to the smart home peripheral device, and wherein the message packet is deliverable to and receivable by the smart home peripheral device without reference to or interpretation of the payload portion of the message packet by any device other than the smart home peripheral device designated by the device identifier of the message packet.

2. The system of claim 1, wherein the device identifier comprises a MAC address of the smart home peripheral device or component thereof.

3. The system of claim 1, wherein the smart home peripheral device comprises a non-native device adapted and configured to communicate to and from an application, and the system provides communication between the application and the smart home peripheral device, and the communication does not comprise interpretation or decoding of the payload portion of the message packet by any device other than the smart home peripheral device and/or the application.

4. The system of claim 1, further comprising a second smart home peripheral device, wherein the smart home peripheral device and the second smart home peripheral device are adapted and configured to perform functions distinct one from the other.

5. The system of claim 1, wherein the message packet comprises all or part of a firmware update and the smart home peripheral device is adapted and configured to receive and install a firmware update transmitted via one or more message packets including the message packet.

6. The system of claim 1, wherein the dispatch unit is adapted and configured to optionally receive the first wireless communication directly from a smart phone, and in response thereto produce and transmit the second wireless communication.

7. The system of claim 1, wherein the smart home peripheral device is adapted and configured to, after receiving according to a BLE protocol a wireless communication comprising the message packet and in response thereto, transmit a wireless communication directly to the internet access point according to a Wi-Fi protocol.

8. The system of claim 1, wherein the smart home peripheral device is adapted and configured to, after receiving according to a BLE protocol a wireless communication comprising the message packet and in response thereto, transmit a wireless communication to the dispatch unit according to a Wi-Fi protocol or a BLE protocol.

9. The system of claim 1, wherein the smart home peripheral device is a device selected from: a switch actuator device, a camera device, an intrusion alarm device, an entry lock device, a fire alarm device, a sensor device, a smart receptacle device, and a legacy control actuator device.

10. The system of claim 1, wherein the smart home peripheral device comprises a housing adapted and configured for installation by an attachment that is a self-affixing attachment or a releasable attachment.

11. The system of claim 1, wherein the system is adapted and configured to automatically detect the presence of a smart home peripheral device in the smart home environment and thereupon to incorporate the detected smart home peripheral device in the system.

12. The system of claim 11, wherein the detected smart home peripheral device is of brand, family, or manufacture different from the brand, family, or manufacture of at least one other smart home peripheral device incorporated in the system.

13. The system of claim 1, wherein the message directed to the smart home peripheral device originates from a digital assistant.

14. The system of claim 13, wherein the digital assistant is selected from: Google Assistant, Amazon Echo, Amazon Alexa, Siri, Cortana.

15. The system of claim 1, wherein the dispatch unit comprises a smart phone executing an application and having an interface controlled by the application.

16. The system of claim 1, wherein the receiver of the dispatch unit is adapted and configured to receive the first wireless communication from the internet access point via a Wi-Fi protocol.

17. The system of claim 1, wherein the first wireless communication comprises a communication according to a Wi-Fi protocol and the second wireless communication is a communication according to a Bluetooth Low Energy (BLE) protocol.

18. A system comprising
a smart home peripheral device;
a server; and
a dispatch unit adapted and configured to receive from the smart home peripheral device an augmented Bluetooth Low Energy (BLE) advertising communication encoding a status condition of the smart home peripheral device, and in response thereto communicate to the server the status condition of the smart home peripheral device,
wherein the smart home peripheral device is adapted and configured to dynamically alter the augmented BLE advertising communication in response to an event or change in a condition of the smart home peripheral device.

19. The system of claim 18, wherein the augmented BLE advertising communication comprises a BLE advertising packet augmented to encode the status condition of the smart home peripheral device.

20. The system of claim 18, wherein the augmented BLE advertising communication comprises a BLE advertising packet augmented to encode a signal that one or more continuation packets will be transmitted, and further comprises the one or more continuation packets.

* * * * *